(12) United States Patent
Diachina et al.

(10) Patent No.: US 12,302,161 B2
(45) Date of Patent: May 13, 2025

(54) QoS MAPPING

(71) Applicant: Telefonaktiebolaget LM Ericsson (publ), Stockholm (SE)

(72) Inventors: John Walter Diachina, Garner, NC (US); Marilet De Andrade Jardim, Kista (SE); Kun Wang, Solna (SE); Kefeng Zhang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 247 days.

(21) Appl. No.: 17/775,334

(22) PCT Filed: Nov. 6, 2020

(86) PCT No.: PCT/IB2020/060492
§ 371 (c)(1),
(2) Date: May 9, 2022

(87) PCT Pub. No.: WO2021/090279
PCT Pub. Date: May 14, 2021

(65) Prior Publication Data
US 2022/0417785 A1    Dec. 29, 2022

Related U.S. Application Data

(60) Provisional application No. 62/933,093, filed on Nov. 8, 2019.

(51) Int. Cl.
*H04W 28/02* (2009.01)
*H04W 72/543* (2023.01)

(52) U.S. Cl.
CPC ... *H04W 28/0236* (2013.01); *H04W 28/0247* (2013.01); *H04W 72/543* (2023.01)

(58) Field of Classification Search
CPC .............. H04W 28/02; H04W 28/0236; H04W 28/0242; H04W 28/0247; H04W 28/0257;
(Continued)

(56) References Cited

U.S. PATENT DOCUMENTS

2018/0132234 A1* 5/2018 Cavalcanti ............ H04W 72/02
2019/0223145 A1* 7/2019 Jung .................. H04W 72/0446
(Continued)

FOREIGN PATENT DOCUMENTS

EP    3316628 A1 *  5/2018  .......... H04B 17/336
EP    3684137 A1 *  7/2020
(Continued)

OTHER PUBLICATIONS

Nokia, et al., "S2-1905588: Discussion—TSCAI Granularity and Reference Time used for TSCAI," 3GPP SA WG2 Meeting #133, May 13-17, 2019, Reno, Nevada, 5 pages.
(Continued)

*Primary Examiner* — Kevin D Mew
(74) *Attorney, Agent, or Firm* — Sonoda & Kobayashi Intellectual Property Law; Darren M. Gardner

(57) ABSTRACT

Systems and methods for Quality of Service (QoS) mapping based on latency and throughput are provided. A method performed by a first node for mapping Time-Sensitive Networking (TSN) streams includes: receiving traffic class specific information for one or more TSN streams; and determining a set of one or more 5G QoS flows to support the traffic class. This provides solutions where 5QI table entries configured by a 5GS can result in underproviding or overproviding the payload capacity made available to support the traffic class. If less payload space is provided, then TSN stream payload corresponding to the traffic class will be lost. If more space is provided, then radio interface resources will be used inefficiently. As such, the solutions identified
(Continued)

herein allow for more efficient use of radio interface resources associated with a 5G QoS flow used to support a set of TSN streams corresponding to a TSN traffic class.

15 Claims, 14 Drawing Sheets

(58) Field of Classification Search
CPC ......... H04W 28/0263; H04W 28/0268; H04W 72/12; H04W 72/1263; H04W 72/1268; H04W 72/1273
See application file for complete search history.

(56) References Cited

U.S. PATENT DOCUMENTS

| | | | |
|---|---|---|---|
| 2019/0254057 A1 | 8/2019 | Hampel et al. | |
| 2019/0313359 A1* | 10/2019 | Lee | H04W 4/40 |
| 2019/0394109 A1* | 12/2019 | Zhang | H04W 24/08 |
| 2020/0112907 A1* | 4/2020 | Dao | H04W 28/0268 |
| 2020/0120536 A1* | 4/2020 | Prakash | H04W 72/21 |
| 2020/0137615 A1* | 4/2020 | Joseph | H04W 24/02 |
| 2020/0205149 A1* | 6/2020 | Khoshnevisan | H04L 5/0055 |
| 2020/0228420 A1* | 7/2020 | Dao | H04L 43/08 |
| 2020/0259896 A1* | 8/2020 | Sachs | H04W 12/06 |
| 2021/0068126 A1* | 3/2021 | Lou | H04L 47/28 |

FOREIGN PATENT DOCUMENTS

| | | | | |
|---|---|---|---|---|
| JP | 2022517015 A | 3/2022 | | |
| WO | WO-2019137524 A1 * | 7/2019 | ............. | H04L 12/14 |
| WO | WO-2020165857 A1 * | 8/2020 | ......... | H04L 12/4641 |
| WO | 2020245805 A1 | 12/2020 | | |
| WO | WO-2020239231 A1 * | 12/2020 | ........... | H04L 45/745 |
| WO | WO-2020245679 A1 * | 12/2020 | ........... | H04L 12/462 |
| WO | WO-2021140464 A1 * | 7/2021 | ......... | H04L 12/1407 |

OTHER PUBLICATIONS

Notice of Reasons for Refusal for Japanese Patent Application No. 2022-519824, mailed Jun. 5, 2023, 6 pages.
Author Unknown, "Technical Specification Group Services and System Aspects; System Architecture for the 5G System (5GS); Stage 2 (Release 15)," Technical Specification 23.501, Version 15.7.0, Sep. 2019, 3GPP Organizational Partners, 247 pages.
Author Unknown, "Technical Specification Group Services and System Aspects; Policy and Charging Control Framework for the 5G System; Stage 2 (Release 15)," Technical Specification 23.503, Version 15.6.0, Jun. 2019, 3GPP Organizational Partners, 82 pages.
Nokia, et al., "S2-1910758: TSCAI granularity," 3GPP SA WG2 Meeting #135, Oct. 14-18, 2019, Split, Croatia, 4 pages.
Ericsson, "S2-190xxxx: MDBV mapping and configuration for TSC QoS Flow," 3GPP TSG-SA WG2 Meeting #136, 23.501 Change Request, Nov. 18-22, 2019, Reno, Nevada, 5 pages.
Ericsson, "S2-190xxxx: MDBV ampping and configuration for TSC QoS Flow," 3GPP TSG-SA WG2 Meeting #136, 23.503 Change Request, Nov. 18-22, 2019, Reno, Nevada, 9 pages.
Ericsson, "S2-190xxxx: clarification for MDBV report and mapping," 3GPP SA WG2 Meeting #S2-135, Nov. 18-22, 2019, Reno, Nevada, 5 pages.
Ericsson, "S2-1910760: Revision on MDBV mapping," 3GPP SA WG2 Meeting #S2-135, Oct. 14-18, 2019, Split, Croatia, 4 pages.
Ericsson, "S2-2002576: MDBV mapping and configuration for TSC QoS Flow," 3GPP SA WG2 Meeting #S2-137E, Feb. 24-27, 2020, Electronic Meeting, 3 pages.
Ericsson, "S2-2002604: MDBV mapping and configuration for TSC QoS Flow," 3GPP SA WG2 Meeting #S2-137E, Feb. 24-27, 2020, Electronic Meeting, 3 pages.
International Search Report and Written Opinion for International Patent Application No. PCT/IB2020/060492, mailed Feb. 5, 2021, 10 pages.
Written Opinion for International Patent Application No. PCT/IB2020/060492, mailed Oct. 22, 2021, 6 pages.
International Preliminary Report on Patentability for International Patent Application No. PCT/IB2020/060492, mailed Januay 21, 2022, 21 pages.
Decision to Grant for Japanese Patent Application No. 2022-519824, mailed Nov. 6, 2023, 5 pages.

* cited by examiner

QoS MAPPING

RELATED APPLICATIONS

This application is a 35 U.S.C. § 371 national phase filing of International Application No. PCT/IB2020/060492, filed Nov. 6, 2020, which claims the benefit of provisional patent application Ser. No. 62/933,093, filed Nov. 8, 2019, the disclosures of which are hereby incorporated herein by reference in their entireties.

TECHNICAL FIELD

The present disclosure relates to Quality of Service (QoS) mapping.

BACKGROUND

A Time-Sensitive Networking (TSN) Traffic Class (TC) consists of one or more TSN streams managed by a TSN network, e.g., CNC. A Centralized Network Controller (CNC) within a TSN network decides how many TSN streams can be aggregated into one TSN Traffic class based on its knowledge of network capability (e.g., latency) and information exchange from CUC (Centralized User Configuration).

When TSN traffic class information is provided to a 5G System (5GS) in support of 5GS—TSN network interworking, the 5G system needs to convey it to different nodes inside the 5G system using 5GS internal signaling and protocols. This allows for realizing 5GS Protocol Data Unit (PDU) sessions consisting of one or more 5GS QoS flows appropriate for supporting each TSN traffic class wherein the traffic supported by each 5GS QoS flow is transmitted using a Data Radio Bearer (DRB) and a General Packet Radio Service Tunneling Protocol User Plane (GTP-U) tunnel. A 5GS therefore performs QoS mapping between a TSN traffic class and one or more 5GS QoS flows to ensure that TSN stream performance attributes are realized whenever TSN traffic is transferred using a 5GS PDU session.

3GPP Rel-16 TS 23.501 has agreed that: The mapping tables between the traffic class and 5GS QoS Profile is provisioned and further used to find suitable 5GS QoS profile to transfer TSN traffic over the PDU Session. QoS mapping procedures are performed in two phases: (1) QoS capability report phase as described in clause 5.28.1, and (2) QoS configuration phase as in clause 5.28.2

The management of TSN streams within the TSN network can be summarized according to the following example:

A set of TSN streams can be aggregated into a common TSN traffic class if they share one or more common attributes e.g., a common 5GS bridge latency requirement.

Assuming an example wherein a set of TSN streams is mapped into a common TSN Traffic class based on 5GS bridge latency, then each of the TSN streams in the set may be transmitted from a TSN network to a 5GS with variable time domain attributes (e.g., PDUs associated with different TSN streams in the same set may occur in the same or different time slices (gate open—gate close interval) that occur periodically within ongoing Qbv cycles (for more information, see IEEE 802.1Qbv)).

The set of TSN streams within a TSN traffic class can be selected such that, when mapped to a specific 5G QoS flow, their cumulative data volume per instance of periodic transmission over the radio interface for that 5G QoS flow does not exceed the value of the Maximum Data Burst Volume (MDBV) attribute of the 5G QoS Identifier (5QI) table index corresponding to that 5G QoS flow (i.e., otherwise data loss will occur for one or more TSN streams per instance of their corresponding periodic transmissions over the radio interface). In some embodiments, a 5QI is a scalar that is used as a reference to 5G QoS characteristics such as access node-specific parameters that control QoS forwarding treatment for the QoS flow (e.g., scheduling weights, admission thresholds, queue management thresholds, link layer protocol configuration, etc.).

Each TSN stream PDU transmitted is sent to the User Plane Function (UPF) (and then gNB) as soon it is received by the UPF Network TSN Translator (UPF-NW-TT). As such, each TSN stream PDU belonging to the same set of TSN streams comprising a given TSN traffic class can be considered to experience an acceptable delay when passing through a 5G system (i.e., regardless of their absolute periodicities and the relative arrival of their TSN stream PDUs at the gNB).

This means that the Packet Delay Budget (PDB) attribute of the 5QI table index corresponding to a given 5G QoS flow can be set to a value that indicates a 5GS residence time value that is acceptable for all TSN streams in the set of TSN streams that makes use of that 5G QoS flow.

In the interest of avoiding TSN traffic loss, it is desirable that the payload capacity of each instance of the periodic DRB resource used in support of a 5G QoS flow be sufficient for supporting the cumulative data volume of the set of TSN streams that it supports for each instance of transmission.

However, there is currently no means to ensure the possibility of TSN traffic loss other than by allocating an overly large payload capacity for each instance of the periodic DRB resources and as such this can lead to inefficient radio resource allocation for DRBs supporting TSN traffic.

Problems with Existing Solutions

There currently exist certain challenge(s). At the 5GS QoS capability report phase, currently there are no 5G QoS parameters reported to AF (application function) that could be read by a Centralized Network Controller (CNC) and used as an indication of 5G system throughput/capacity/bandwidth, (e.g., size of packet/frame, or bit/second, or other indicator) available for TSN traffic transmission (e.g., on a per 5G QoS flow specific basis). Therefore, when a CNC decides how many TSN streams that can be supported within a specific TSN traffic class, it cannot take into account 5GS throughput capability information that could affect this decision.

In 3GPP, every 5G QoS flow has a corresponding 5QI table index used to identify key QoS characteristics such as MDBV (maximum data burst volume).

TS 23.501 clause 5.27.2 states: "The maximum value of Time Sensitive Communications (TSC) Burst Size should be mapped to a 5QI with MDBV that is equal or higher. For TSC QoS Flows, MDBV (described in clause 5.7.3.7 of TS 23.501) is set to the Maximum Burst Size of the aggregated TSC streams to be allocated to this QoS Flow. If the AF does not provide a TSC Burst Size for aggregated TSC streams, then the MDBV is set to the default value for the TSC 5QI of the corresponding traffic class."

The maximum value of TSC Burst Size should therefore always be mapped to a 5QI with MDBV that is equal or higher than the Maximum Burst Size of the aggregated TSC streams.

MDBV identifies the maximum cumulative payload from all TSN streams that map to a TSN traffic class supported using a 5G QoS flow that supports that MDBV. In other words, the MDBV identifies the maximum traffic payload that can be sent per instance of traffic transmission over the radio interface for its corresponding 5G QoS flow and therefore limits the throughput of a QoS flow.

However, TS 23.501 does not currently include MDBV within the set of TSN QoS-related parameters that are relevant for ensuring the TSN QoS requirements are realized by 5G systems.

This effectively means that a 5GS currently has no accurate mechanism whereby it can populate the MDBV parameter for any given 5QI table index to reflect the maximum cumulative payload from all TSN streams supported by the 5G QoS flow corresponding to that 5QI table index.

This can be problematic in that a 5GS is forced to artificially establish a MDBV attribute value for each 5QI table index value that a 5G QoS flow maps to i.e., the value could be too small (in which case there will not be enough payload space per instance of traffic transmission over the radio interface for that 5G QoS flow) or it could be too large (in which radio interface capacity will be wasted for each instance of traffic transmission over the radio interface for that 5G QoS flow).

5QI is reported to the AF but, although MDBV is part of 5QI parameter, it is not provided to the AF, i.e., only the Latency (i.e. PDB) is currently reported.

The maximum cumulative value of TSC Burst Size corresponding to the traffic of all TSN steams that are part of the same TSN traffic class should be mapped to a 5QI with MDBV that is equal or higher than the cumulative TSC burst size value.

TS 23.501 Clause 5.28.4 states: "The minimum set of TSN QoS-related parameters that are relevant for mapping the TSN QoS requirements in the 5GS are: traffic classes and their priorities per port, bridge delays per port pair and traffic class (independentDelayMax, independentDelayMin, dependentDelayMax, dependentDelayMin), and propagation delay per port (txPropagationDelay)".

This shows that Bridge delay and propagation delay are the key parameters for mapping between TSN Traffic class to 5G QoS flows as defined in 23.501 section 5.28.1.

However, even if the the TSN Traffic class delay related parameters are supported by the DRB and GTP-U tunnel used to realize a 5G QoS flow, there can still be problems:

The cumulative traffic of a TSN traffic class per transmission instance over the radio interface of its corresponding 5G QoS flow (determined by all TSN streams that map to that TSN traffic class) can have a value larger than what that 5G QoS flow can provide.

FIG. 1 illustrates multiple TSN streams in Traffic class A.
QoS characteristics of Traffic class A:
1. requires Bridge delay 10 ms,
2. has burst size: 1600 byte (accumulated payload of all TSN streams), or any other indicator that hints throughput of the traffic class A.
5G QoS flow "x": 5QI:
1. PDB=8 ms
2. MDBV=255 byte
5GS QoS capability report to AF:
1. Reported Bridge delay based on 5G QoS flow "x" is 10 ms=PDB (8 ms based on 5QI+other 5G delay parameters (e.g., UE-DS-TT residence time)

CNC sends a bridge configuration request to TSN AF for Traffic class A transmission, the AF will map the CNC QoS requirement of Traffic class A (e.g., bridge delay) to a 5G QoS parameter and the AF will then try to find a 5G QoS flow that can satisfy the Traffic class requirements (i.e., 10 ms PDB per the example above). Alternatively, the AF can distribute the CNC QoS requirement of Traffic class A to relevant 5G nodes that can do the QoS mapping to one or more appropriate 5G QoS flows. Improved systems and methods for mapping TSN streams are needed.

SUMMARY

Systems and methods for Quality of Service (QoS) mapping based on latency and throughput are provided. In some embodiments, a method performed by a first node for mapping Time-Sensitive Networking (TSN) streams includes receiving traffic class specific information for one or more TSN streams; and determining a set of one or more 5G QoS flows to support the traffic class. The embodiments provided herein provide solutions to the legacy problem wherein 5QI table entries configured by a 5GS can result in corresponding 5G QoS flows being established for which corresponding instances of radio interface transmissions provide less than or more than the payload space required by all TSN streams supported using that 5G QoS flow. If less payload space than is required by a set of TSN streams is provided per radio interface transmission of a 5G QoS flow used in support of that set of TSN streams then TSN stream payload will be lost. If more payload space than is required by a set of TSN streams is provided per radio interface transmission of a 5G QoS flow used in support of that set of TSN streams then radio interface resources will be used inefficiently. As such, the solutions identified herein allow for more efficient use of radio interface resources associated with a 5G QoS flow used to support a set of TSN flows (streams) corresponding to a TSN traffic class.

Certain aspects of the present disclosure and their embodiments may provide solutions to the aforementioned or other challenges. Methods are described for how a 5GS can populate a 5QI table with one or more entries wherein each entry supports a QoS flow specific MDBV parameter that reflects what the 5GS determines it can practically support regarding MDBV per instance of traffic transmission over the radio interface for 5G QoS flows. In some embodiments, the CNC makes a decision regarding which TSN streams to include within any given traffic class and thereby implicitly establishes a value for the maximum payload volume that needs to be supported per instance of transmission for all TSN streams in that traffic class. The CNC then provides the 5GS with traffic class specific information (e.g., traffic class specific PDB and maximum payload volume per transmission instance for each TSN stream in that traffic class) which the 5GS uses to determine the set of one or more 5G QoS flows to support that traffic class. The basic embodiments are as follows:

Embodiment 1: The 5GS establishes a set of 5QI table entries for which different values for the PDB and MDBV attributes are determined independent of knowing which TSN streams the CNC will map to any given traffic class. Upon receiving TSN traffic class specific information the 5GS maps the corresponding TSN streams into subgroups where each subgroup is supported by a common 5G QoS flow. Each 5G QoS flow used to support a subgroup is selected such that it ensures the PDB requirement and maximum payload volume per transmission instance of the corresponding subgroup is satisfied. As such, this embodiment allows for ensuring that all TSN streams in each subgroup associated with any given TSN traffic class are efficiently supported using multiple 5G QoS flows (i.e., the radio interface bandwidth allocated in support of each 5G QoS flow can be made equal to or slightly larger than the actual bandwidth requirements of the subgroup of TSN streams supported thereon).

Embodiment 2: Similar to embodiment 1, the 5GS establishes a set of 5QI table entries for which different values for the PDB and MDBV attributes are determined independent of knowing which TSN streams the CNC will map to any given traffic class. Upon receiving TSN traffic class specific information the 5GS decides to configure one or more new 5QI table entries wherein each has an appropriate PDB attribute and MDBV attribute that, when considered together, provide a value large enough to support maximum payload volume per transmission instance for all TSN streams comprising that TSN traffic class. As such, this embodiment allows for ensuring that all TSN streams associated with any given TSN traffic class are efficiently supported using one or more 5G QoS flows (i.e., the radio interface bandwidth allocated in support of the one or more 5G QoS flows can be made equal to or slightly larger than the actual bandwidth requirements of all TSN streams comprising the TSN traffic class that these one or more 5G QoS flows support).

Embodiment 3: The 5GS establishes a set of 5QI table entries for which different values for the PDB and MDBV attributes are first determined and then provides this information to a CNC. In some embodiments, the CNC then makes a decision regarding which TSN streams to include within any given traffic class and thereby ensures that the maximum payload volume that needs to be supported per instance of transmission for all TSN streams within each traffic class will be efficiently supported by a 5QI table entry already configured by the 5GS (i.e., when the CNC maps a set of TSN streams to a TSN traffic class it ensures the maximum payload volume per transmission instance for all TSN streams comprising that TSN traffic class is equal to or slightly less than the MDBV attribute of a 5QI table entry for which it has received information from the 5GS). Upon receiving traffic class specific information from the CNC the 5GS can then map the corresponding TSN streams into an already existing 5G QoS flow that efficiently supports the bandwidth requirements of those TSN streams. As such, this embodiment allows for ensuring that all TSN streams associated with any given TSN traffic class are efficiently supported using a single 5G QoS flow (i.e., this embodiment ensures that the admission of any given TSN traffic class by a 5GS ensures that the TSN streams associated with that TSN traffic class will be successfully supported by the 5GS and allows for realizing that support over the radio interface in a bandwidth efficient manner).

In some embodiments, the CNC decides which ports the Stream will be traversing through. The Stream has an allocated priority and therefore the traffic class is set from start. The flow of a traffic class is always associated to a port pair. Note that there are many flows of the same traffic class in the bridge; the difference is that they go through different port pairs.

There are, proposed herein, various embodiments which address one or more of the issues disclosed herein. In some embodiments, a method performed by a first node for mapping TSN streams includes one or more of receiving traffic class specific information for one or more TSN streams; and determining a set of one or more 5G QoS flows to support the traffic class.

In some embodiments, receiving the traffic class specific information for the one or more TSN streams comprises receiving traffic class specific PDB and maximum payload volume per transmission instance for each TSN stream in that traffic class.

In some embodiments, the method includes one or more of establishing a set of 5G QoS Identifier, 5QI, table entries for which different values are determined independent of knowing which TSN streams will map to any given traffic class; and upon receiving TSN traffic class specific information, mapping the corresponding TSN streams into subgroups where each subgroup is supported by a common 5G QoS flow.

In some embodiments, the different values comprise different values for one or more of the PDB and MDBV attributes.

In some embodiments, each 5G QoS flow used to support a subgroup is selected such that it ensures the PDB requirement and maximum payload volume per transmission instance of the corresponding subgroup is satisfied.

In some embodiments, the method includes ensuring that all TSN streams in each subgroup associated with any given TSN traffic class are efficiently supported using multiple 5G QoS flows.

In some embodiments, the radio interface bandwidth allocated in support of each 5G QoS flow can be made equal to or slightly larger than the actual bandwidth requirements of the subgroup of TSN streams supported thereon.

In some embodiments, the method includes, upon receiving TSN traffic class specific information, configuring one or more new 5QI table entries wherein each has an appropriate PDB attribute and MDBV attributes that, when considered together, provide a value large enough to support maximum payload volume per transmission instance for all TSN streams comprising that TSN traffic class.

In some embodiments, the method includes ensuring that all TSN streams associated with any given TSN traffic class are efficiently supported using one or more 5G QoS flows.

In some embodiments, the radio interface bandwidth allocated in support of the one or more 5G QoS flows can be made equal to or slightly larger than the actual bandwidth requirements of all TSN streams comprising the TSN traffic class that these one or more 5G QoS flows support.

In some embodiments, the method includes, upon receiving TSN traffic class specific information, mapping the corresponding TSN streams into an already existing 5G QoS flow that efficiently supports the bandwidth requirements of those TSN streams.

In some embodiments, the method includes ensuring that all TSN streams associated with any given TSN traffic class are efficiently supported using a single 5G QoS flow.

In some embodiments, the method includes ensuring that the admission of any given TSN traffic class by a 5GS ensures that the TSN streams associated with that TSN traffic class will be successfully supported by the 5GS and allows for realizing that support over the radio interface in a bandwidth efficient manner.

In some embodiments, the first node is a 5G node. In some embodiments, the first node is a TSN AF. In some embodiments, the traffic class specific information is received from a CNC within a TSN network.

In some embodiments, a method performed by a second node for mapping TSN streams, includes one or more of: deciding which TSN streams to include within any given traffic class; and transmitting traffic class specific information for the one or more TSN streams.

In some embodiments, deciding which TSN streams to include within any given traffic class comprises implicitly establishing a value for the maximum payload volume that needs to be supported per instance of transmission for all TSN streams in that traffic class.

In some embodiments, deciding which TSN streams to include within any given traffic class comprises ensuring that the maximum payload volume that needs to be supported per instance of transmission for all TSN streams within each traffic class will be efficiently supported by a 5QI table entry already configured by the 5GS.

In some embodiments, deciding which TSN streams to include within any given traffic class comprises ensuring the maximum payload volume per transmission instance for all TSN streams comprising that TSN traffic class is equal to or slightly less than the MDBV attribute of a 5QI table entry for which it has received information from the 5GS.

In some embodiments, the second node is a CNC within a TSN network. In some embodiments, the traffic class specific information is transmitted to a 5G node. In some embodiments, the 5G node is a TSN AF.

Certain embodiments may provide one or more of the following technical advantage(s). The embodiments provided herein provide solutions to the legacy problem wherein 5QI table entries configured by a 5GS can result in corresponding 5G QoS flows being established for which corresponding instances of radio interface transmissions provide less than or more than the payload space required by all TSN streams supported using that 5G QoS flow. If less payload space than is required by a set of TSN streams is provided per radio interface transmission of a 5G QoS flow used in support of that set of TSN streams then TSN stream payload will be lost. If more payload space than is required by a set of TSN streams is provided per radio interface transmission of a 5G QoS flow used in support of that set of TSN streams then radio interface resources will be used inefficiently. As such, the solutions identified herein allow for more efficient use of radio interface resources associated with a 5G QoS flow used to support a set of TSN flows (streams) corresponding to a TSN traffic class.

Methods are described whereby a 5G QoS flow can be made to efficiently support the traffic associated with a set of TSN streams associated with a TSN traffic class and a port pair. The efficiency is realized in that the DRB resources per transmission instance of the 5G QoS flow are neither too small (in which case less payload space would be available than is needed per transmission instance on the radio interface) nor excessively large (in which case substantially more payload space than is needed is provided per transmission instance on the radio interface).

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
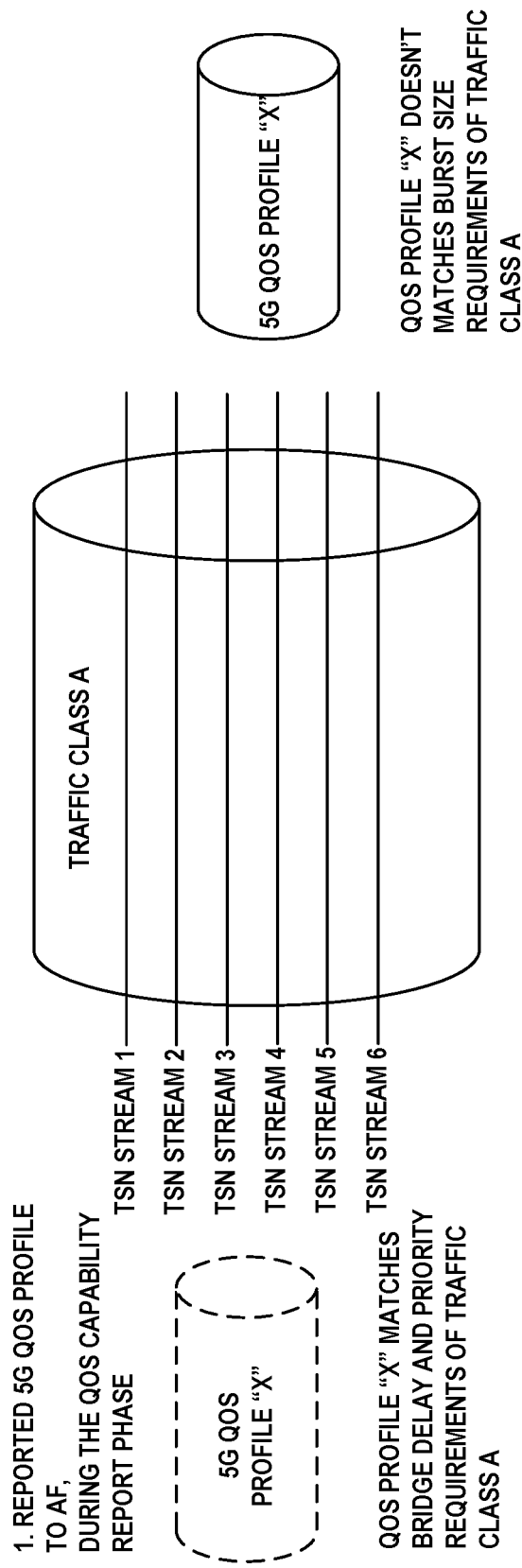
FIG. 1 illustrates multiple Time-Sensitive Networking (TSN) streams in Traffic class A.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Function (AMF), a UPF, a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 2:
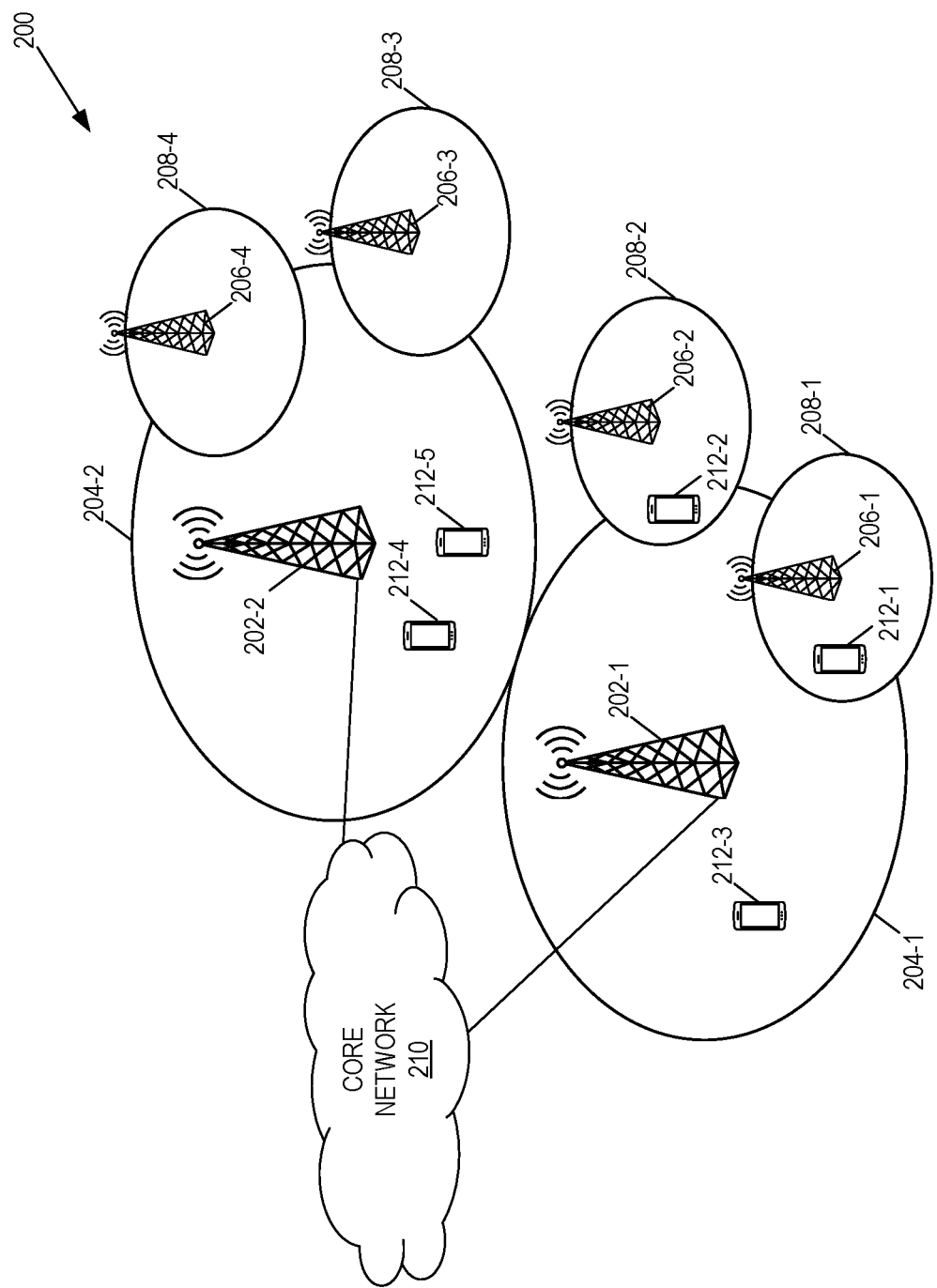
FIG. 2 illustrates one example of a cellular communications system in which embodiments of the present disclosure may be implemented.

FIG. 2 illustrates one example of a cellular communications system 200 in which embodiments of the present disclosure may be implemented. In the embodiments described herein, the cellular communications system 200 is a 5G system (5GS) including a NR RAN or LTE RAN (i.e., E-UTRA RAN). In this example, the Radio Access Network (RAN) includes base stations 202-1 and 202-2, which in 5G NR are referred to as gNBs (e.g., LTE RAN nodes connected to 5GC, which are referred to as gn-eNBs), controlling corresponding (macro) cells 204-1 and 204-2. The base stations 202-1 and 202-2 are generally referred to herein collectively as base stations 202 and individually as base station 202. Likewise, the (macro) cells 204-1 and 204-2 are generally referred to herein collectively as (macro) cells 204 and individually as (macro) cell 204. The RAN may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The cellular communications system 200 also includes a core network 210, which in the 5GS is referred to as the 5G core (5GC). The base stations 202 (and optionally the low power nodes 206) are connected to the core network 210.

The base stations 202 and the low power nodes 206 provide service to wireless communication devices 212-1 through 212-5 in the corresponding cells 204 and 208. The wireless communication devices 212-1 through 212-5 are generally referred to herein collectively as wireless communication devices 212 and individually as wireless communication device 212. In the following description, the wireless communication devices 212 are oftentimes UEs, but the present disclosure is not limited thereto.

At the 5GS QoS capability report phase, currently there are no 5G QoS parameters reported to AF (application function) that could be read by a Centralized Network Controller (CNC) and used as an indication of 5G system throughput/capacity/bandwidth, (e.g., size of packet/frame, or bit/second, or other indicator) available for TSN traffic transmission (e.g., on a per 5G QoS flow specific basis). Therefore, when a CNC decides how many TSN streams that can be supported within a specific TSN traffic class, it cannot take into account 5GS throughput capability information that could affect this decision.

In 3GPP, every 5G QoS flow has a corresponding 5QI table index used to identify key QoS characteristics such as MDBV (maximum data burst volume).

TS 23.501 clause 5.27.2 states: "The maximum value of TSC Burst Size should be mapped to a 5QI with MDBV that is equal or higher. For TSC QoS Flows, MDBV (described in clause 5.7.3.7) is set to the Maximum Burst Size of the aggregated TSC streams to be allocated to this QoS Flow. If the AF does not provide a TSC Burst Size for aggregated TSC streams, then the MDBV is set to the default value for the TSC 5QI of the corresponding traffic class."

The maximum value of TSC Burst Size should therefore always be mapped to a 5QI with MDBV that is equal or higher than the Maximum Burst Size of the aggregated TSC streams.

MDBV identifies the maximum cumulative payload from all TSN streams that map to a TSN traffic class supported using a 5G QoS flow that supports that MDBV. In other words, the MDBV identifies the maximum traffic payload that can be sent per instance of traffic transmission over the radio interface for its corresponding 5G QoS flow and therefore limits the throughput of a QoS flow.

However, TS 23.501 does not currently include MDBV within the set of TSN QoS-related parameters that are relevant for ensuring the TSN QoS requirements are realized by 5G systems.

This effectively means that a 5GS currently has no accurate mechanism whereby it can populate the MDBV parameter for any given 5QI table index to reflect the maximum cumulative payload from all TSN streams supported by the 5G QoS flow corresponding to that 5QI table index.

This can be problematic in that a 5GS is forced to artificially establish a MDBV attribute value for each 5QI table index value that a 5G QoS flow maps to i.e., the value could be too small (in which case there will not be enough payload space per instance of traffic transmission over the radio interface for that 5G QoS flow) or it could be too large (in which radio interface capacity will be wasted for each instance of traffic transmission over the radio interface for that 5G QoS flow).

5QI is reported to the AF but, although MDBV is part of the 5QI parameter, it is not provided to AF, i.e., only Latency (i.e. PDB) is currently reported.

The maximum cumulative value of TSC Burst Size corresponding to the traffic of all TSN steams that are part of the same TSN traffic class should be mapped to a 5QI with MDBV that is equal or higher than the cumulative TSC burst size value.

TS 23.501 Clause 5.28.4 states: "The minimum set of TSN QoS-related parameters that are relevant for mapping the TSN QoS requirements in the 5GS are: traffic classes and their priorities per port, bridge delays per port pair and traffic class (independentDelayMax, independentDelayMin, dependentDelayMax, dependentDelayMin), and propagation delay per port (txPropagationDelay)".

This shows that Bridge delay and propagation delay are the key parameters for mapping between TSN Traffic class to 5G QoS flows as defined in 23.501 section 5.28.1.

However, even if the delay related parameters for these TSN Traffic classes are supported by the DRB and GTP-U tunnel used to realize a 5G QoS flow, there can still be problems. For instance, the cumulative traffic of a TSN traffic class per transmission instance over the radio interface of its corresponding 5G QoS flow (determined by all TSN streams that map to that TSN traffic class) can have a value larger than what that 5G QoS flow can provide.

As discussed above, FIG. 1 illustrates there can be multiple TSN streams in Traffic class A. CNC sends a bridge configuration request to the TSN AF for Traffic class A transmission, the AF will map the CNC QoS requirement of Traffic class A (e.g., bridge delay) to a 5G QoS parameter and the AF will then try to find a 5G QoS flow that can satisfy the Traffic class requirements (i.e., 10 ms PDB per the example above). Alternatively, the AF can distribute the CNC QoS requirement of Traffic class A to relevant 5G nodes that can do the QoS mapping to one or more appropriate 5G QoS flows.

When 5GS finds a 5G QoS flow "x" that matches the bridge delay requirement of Traffic class A but doesn't match the burst size requirement, then if there are no other reported 5G QoS flows that can match the burst size requirements, it will cause a problem i.e., Traffic Class A cannot be transmitted over the 5GS. Improved systems and methods for mapping TSN streams are therefore needed.

Figure 3:
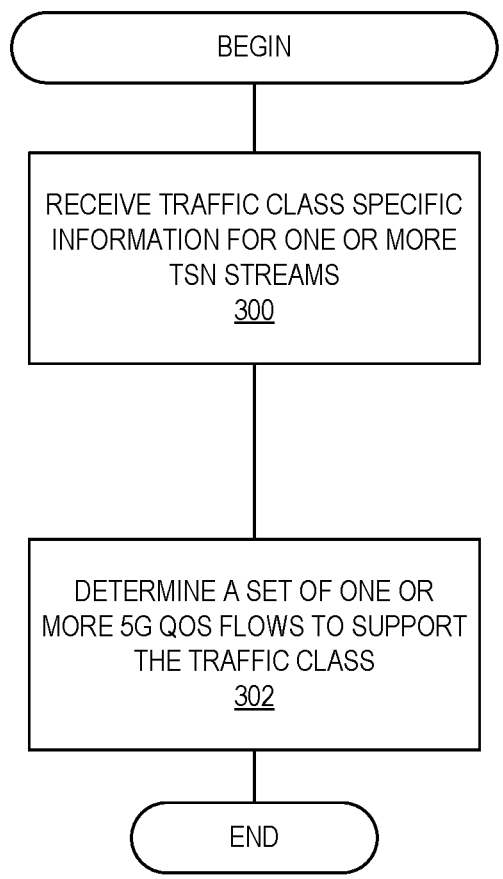
FIG. 3 illustrates a method performed by a first node for mapping TSN streams, according to some embodiments of the present disclosure.
Figure 4:
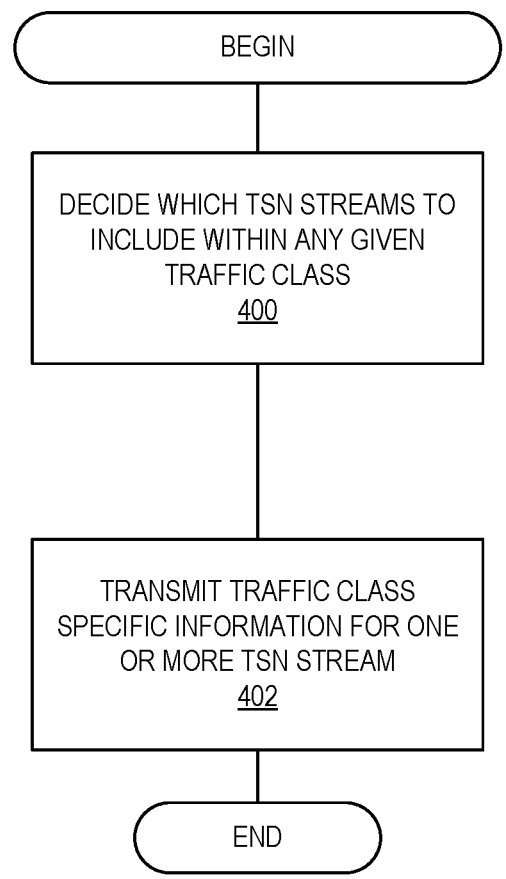
FIG. 4 illustrates a method performed by a second node for mapping TSN streams, according to some embodiments of the present disclosure.

Systems and methods for QoS mapping based on latency and throughput are provided. FIG. 3 illustrates a method performed by a first node for mapping TSN streams, according to some embodiments of the present disclosure. FIG. 4 illustrates a method performed by a second node for mapping TSN streams, according to some embodiments of the present disclosure. In some embodiments, a method performed by a first node for mapping TSN streams includes receiving (step 300) traffic class specific information for one or more TSN streams; and determining (step 302) a set of one or more 5G Quality of Service, QoS, flows to support the traffic class.

In some embodiments, a method performed by a second node for mapping TSN streams includes: deciding (step 400) which TSN streams to include within any given traffic class; and transmitting (step 402) traffic class specific information for one or more TSN stream.

The embodiments provided herein provide solutions to the legacy problem wherein 5QI table entries configured by a 5GS can result in corresponding 5G QoS flows being established for which corresponding instances of radio interface transmissions provide less than or more than the payload space required by all TSN streams supported using that 5G QoS flow. If less payload space than is required by a set of TSN streams is provided per radio interface transmission of a 5G QoS flow used in support of that set of TSN streams, then the TSN stream payload will be lost. If more payload space than is required by a set of TSN streams is provided per radio interface transmission of a 5G QoS flow used in support of that set of TSN streams, then radio interface resources will be used inefficiently. As such, the solutions identified herein allow for more efficient use of radio interface resources associated with a 5G QoS flow used to support a set of TSN flows (streams) corresponding to a TSN traffic class.

Figure 5:
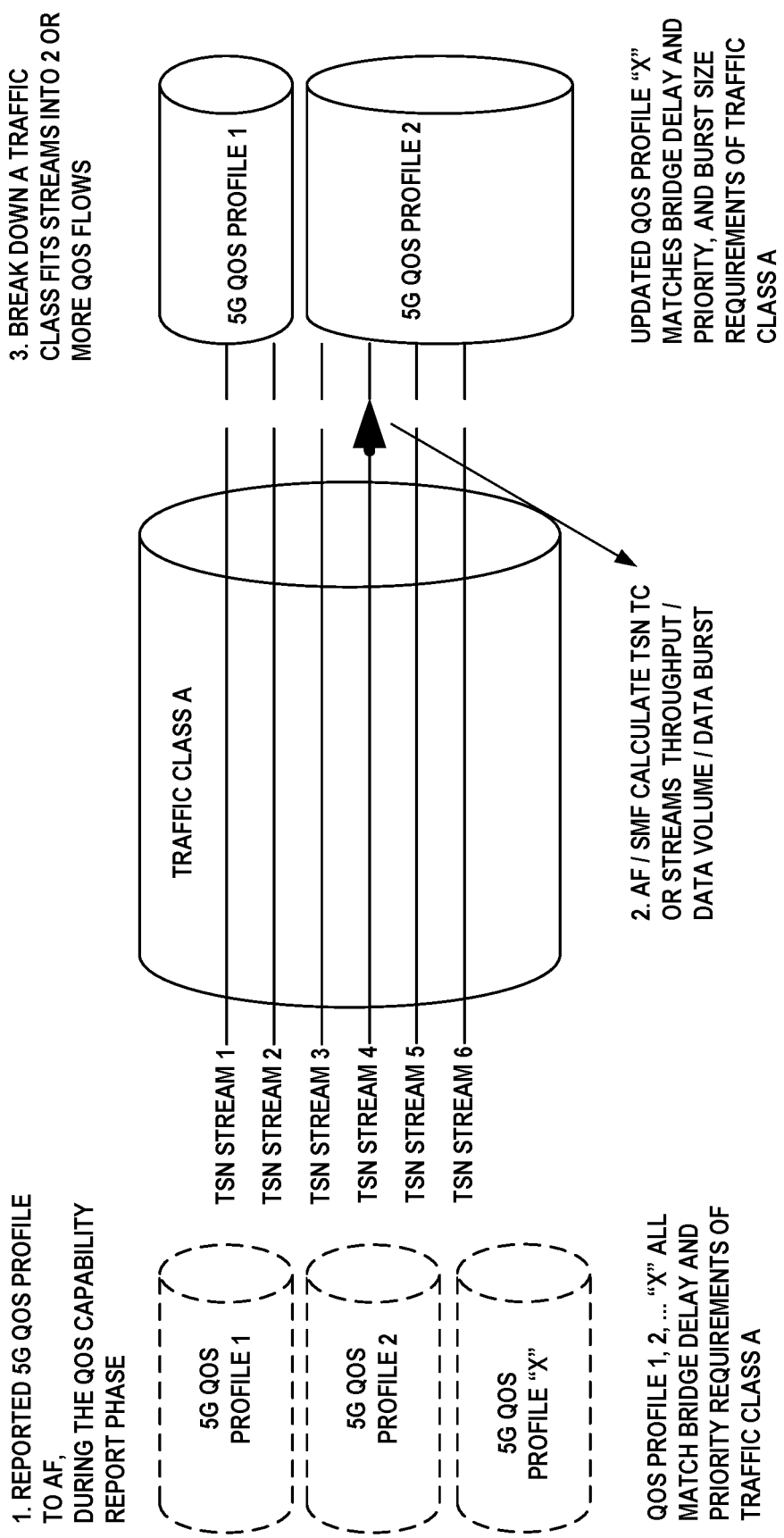
FIG. 5 illustrates an example of TSN streams in Traffic class A, according to some embodiments of the present disclosure.

Since there are no reported 5G QoS flows (during the capability report phase) that match the packet/frame/burst size requirement of Traffic class A, then it can be broken down into several multiple subgroups. FIG. 5 illustrates an example of TSN streams in Traffic class A.

Step 1:

During the capability report phase, certain available 5G QoS flows with specific 5QIs are pre-selected for reporting. Those QoS flows characteristics can be divided into two categories.

a. PDB value b. MDBV and others

The parameters may be reported in other formats, e.g., "bridge delay", "bitrate", etc. Or in combination of other parameters. E.g., Reported Bridge delay per port pair and per traffic class based on a 5G QoS flow=5QI PDB+other 5G delay parameters (e.g., UE-DS-TT residence time)

Only the category "a" parameters are reported to the AF, e.g., PDB is considered as part of Bridge delay. Category "b" is part of QoS flow characteristics, but it is not provided to AF. Category "b" is used by 5GS internally.

Step 2:

During the bridge configuration phase, CNC provides QoS requirements to TSN AF and request for configuration.

a. The bridge delay requirement can be mapped according to current TS23.501.

b. The throughput (or burst size) of a TSN traffic class and also the throughput of every TSN stream inside the TSN traffic class can be extracted. For example, by gate operation of IEEE 802.11Qci (other alternatives are possible). The IEEE 802.1Qci information can be provided from CNC to AF. AF can calculate the throughput/burst size of TSN streams or TSN traffic class, and then provides this information to other nodes of 5GS. Variation: AF can pass IEEE 802.1Qci information to other 5GS nodes, e.g., SMF, for calculation the throughput/burst size, and then distribute it.

Step 3:

Since the 5GS knows the throughput/burst size of every TSN stream of a TSN traffic class it can search for available QoS flows that have already been reported to AF and have bridge delay, priority characteristics that match the traffic class requirement. Each TSN traffic class can then be organized into several subgroups, so that the TSN streams in each subgroup can be successfully mapped to a 5G QoS flow with a specific MDBV value that can actually be supported by the 5G system (see capability report phase, multiple QoS flow of fixed 5QI are reported, every 5QI has a fixed MDBV value)

An Example of the method 1 is shown in the figure

Step1 (a) Example:
  5GS QoS capability report to AF:
  1. Reported Bridge delay based on 5G QoS flow "1" is 10 ms=PDB (8 ms based on 5QI)+other 5G delay parameters (e.g., UE-DS-TT residence time)
  2. Reported Bridge delay based on 5G QoS flow "2" is 10 ms=PDB (8 ms based on 5QI)+other 5G delay parameters (e.g., UE-DS-TT residence time)

Step1 (b) Example:
  1. MDBV of 5G QoS flow "1" is: 255 byte
  2. MDBV of 5G QoS flow "2" is 1300 byte
  QoS characteristics of Traffic class A and port pair 1-2:

Step2 (a) Example
  1. Bridge delay 10 ms,

Step2 (b) Example
  2. burst size of a traffic class is =1600 byte,
  3. burst size of a TSN traffic stream 1-6 is shown as below:

| TSN stream1 | TSN stream2 | TSN stream3 | TSN stream4 | TSN stream5 | TSN stream6 |
|---|---|---|---|---|---|
| 100 | 340 | 300 | 360 | 360 | 140 |

Step3 Example:

In the capability reported QoS flow database, 5GS finds QoS flow1 and QoS flow2 that can match the reported bridge delay, but cannot find a QoS flow can accommodate the burst size of Traffic class A.

5GS breaks down the traffic class A, and then finds TSN stream1 and TSN stream 6 can fit into the QoS flow 1 according to MDBV or QoS flow1. And in a similar way, it finds TSN stream 2, 3, 4, 5 can be fit into QoS flow 2. In some embodiments, this might be accomplished according to the arrival times (e.g., from IEEE 802.1Qci extraction method) the flows that go together might be selected by order of arrival. Otherwise, the flows will be spread. In some embodiments, it is assumed that the user plane will be able to identify which Stream the arriving frames belong to.

In such a way 5GS maps Traffic class A into two QoS flows that can satisfy both latency and burst size/throughput requirements.

5GS knows the throughput/burst size of every TSN streams of a traffic class; it can search for available QoS flows that have already reported to AF, and then find two or more QoS flows to accommodate the Traffic class.

Figure 6:
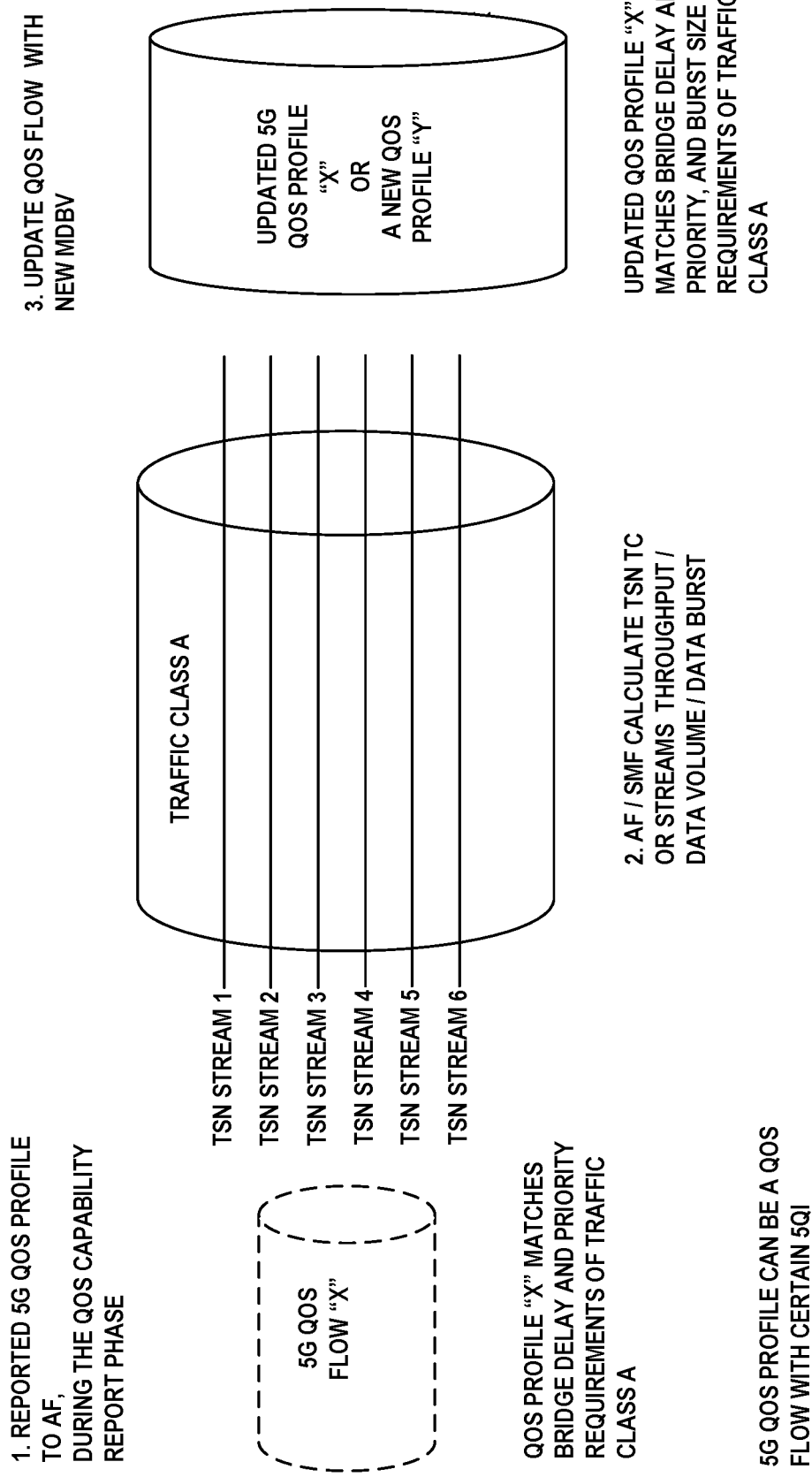
FIG. 6 illustrates updating 5G QoS flow information to include new throughput/burst size parameter, according to some embodiments of the present disclosure.

Method 2 includes updating 5G QoS flow information to include new throughput/burst size parameter. An example of this is illustrated in FIG. 6. Method 2 will keep one to one mapping between a TSN traffic class and a 5G QoS flow unchanged.

Step 1:

During the capability report phase, certain available 5G QoS flows with specific 5QIs are pre-selected for reporting to the AF. Those QoS flows characteristics can be divided into two categories.
  a. PDB value
  b. MDBV and others The parameters may be reported in other format, e.g., "bridge delay", "bitrate", etc. Or in combination of other parameters, e.g.,
  Reported Bridge delay based on a 5G QoS flow=5QI PDB+other 5G delay parameters (e.g., UE-DS-TT residence time)

Only the category "a" parameters are reported to AF, e.g., PDB is considered as part of Bridge delay. Category "b" although is part of QoS flow characteristics, but it is not provided to AF. Category "b" is used by 5GS internally.

Step 2:

During the bridge configuration phase, CNC provides TSN traffic class specific QoS requirements to AF and requests configuration of appropriate 5G QoS flow resources.

The QoS requirements of TSN traffic class are:
  a. The bridge delay requirement can be mapped according to current TS23.501.
  b. The throughput (or burst size) of a TSN traffic class, and also the throughput of every TSN stream inside the TSN traffic class can be extracted. For example, by gate operation of IEEE8.201Qci (other alternatives can be possible). The IEEE 802.1Qci information can be provided from CNC to AF. AF can calculate the throughput/burst size of TSN streams or TSN traffic class, and then provides this information to other nodes of 5GS. Variation: AF can pass IEEE 802.1Qci information to other 5GS nodes, e.g., SMF, for calculation the throughput/burst size, and then distribute it.

Step 3:

Since the 5GS knows the throughput/burst size of the traffic class, it can search for reported QoS flows that have a matching bridge delay and priority requirement of the traffic class. If no 5G QoS flow can be found to match the QoS requirements of the traffic class, the 5GS can either update an existing reported QoS profile/flow that matches bridge delay and priority requirement of the traffic class with a new MDBV value that is equal or higher than the burst size of the traffic class, or 5GS can create a new QoS flow with a 5QI table entry (can be non-standard) with a new (custom) MDBV value that can satisfy the Traffic class throughput/burst size requirement. Alternatively, 5GS can also create multiple standard/custom QoS flows/profiles that have smaller MDBVs. In some embodiments, the sum of these MDBV values should be equal or higher than the burst size of the traffic class.

An Example of the method 1 is shown in the figure

Step1 (a) Example:
  5GS QoS capability report to AF:
  a. Reported Bridge delay based on 5G QoS flow "x" is 10 ms=PDB (8 ms based on 5QI)+other 5G delay parameters (e.g., UE-DS-TT residence time)

Step1 (b) Example:
  b. MDBV of 5G QoS flow "x" is 1300 byte
  QoS characteristics of Traffic class A:

Step2 (a) Example
  a. Bridge delay 10 ms,

Step2 (b) Example
  b. has burst size: 1600 byte (accumulated payload of all TSN streams), or any other indicator hints throughput of the traffic class A.

Step3 Example:

In the capability reported QoS flow database, 5GS finds QoS flow "x" only matches latency requirements but not the MDBV requirement, and there are no other QoS flows that matches both latency and the burst size requirement of Traffic class A.

5GS update QoS flow "x" or create a new QoS flow "y" with following parameters.

5GS QoS capability report to AF:
1. Reported Bridge delay based on 5G QoS flow "x" is 10 ms=5QI PDB (8 ms)+other 5G delay parameters (e.g., UE-DS-TT residence time)
   a. in the case of updating, this part doesn't need to be changed.
2. Update 5G QoS flow "x" with new MDNV=1600 byte In such a way 5GS maps Traffic class A into an updated QoS flow "x" that can satisfy both latency and burst size/throughput requirements.

Figure 7:
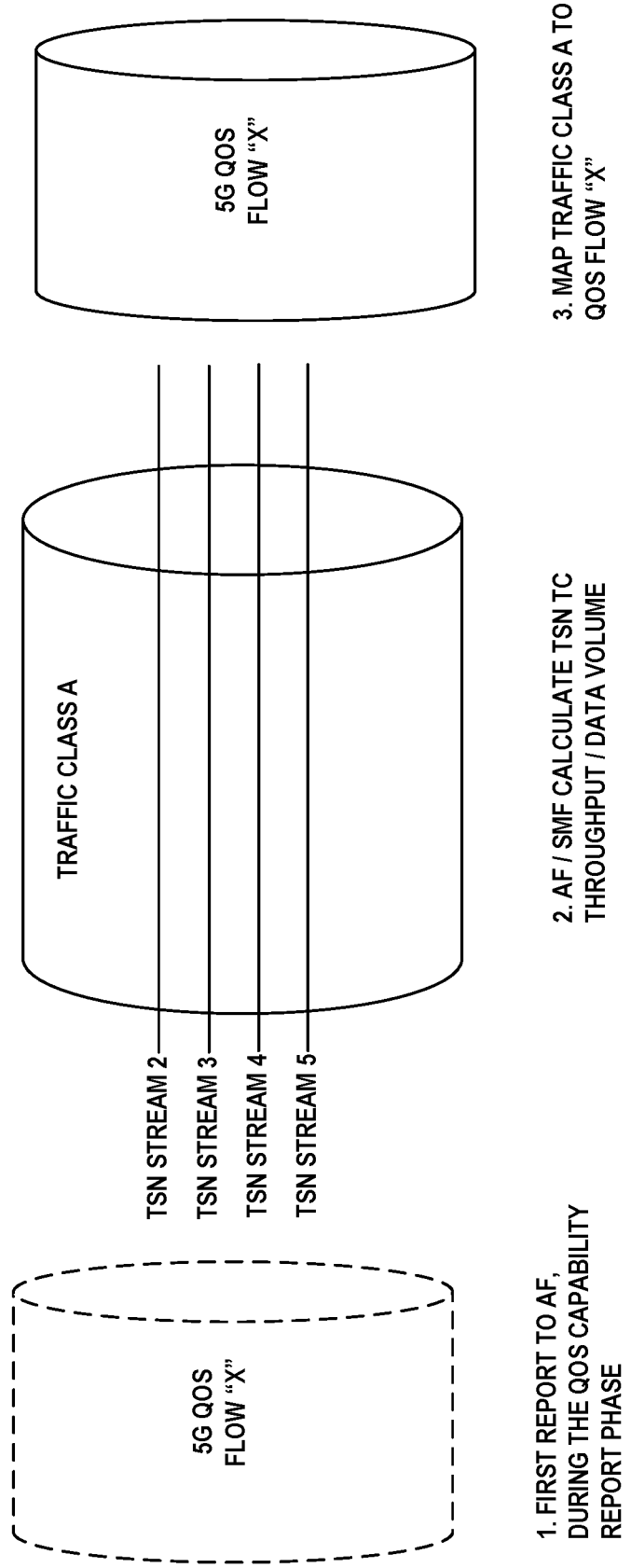
FIG. 7 illustrates the link/port throughput/capacity parameters are directly reported, according to some embodiments of the present disclosure.

In Method 3, the link/port throughput/capacity parameters are directly reported. An example of this is illustrated in FIG. 7. During the capability reporting phase as described in 23.501 section 5.28.1, the characteristics of a 5G QoS flow (or a port, or a link), e.g., MDBV, is reported to TSN AF. In such a case, the CNC can also be provided with and use that information to aggregate only a limited number of TSN streams into a traffic class per port pair that matches the throughput report of a port/link/5G QoS flow.

Step 1:

During the capability report phase, certain available QoS flows with specific 5QIs are pre-selected for reporting. Those QoS flows characteristics can be divided in to two categories.
   a. PDB value
   b. MDBV and others The parameters may be reported in other format, e.g., "bridge delay", "bitrate", etc. Or in combination of other parameters, e.g.,
   Reported Bridge delay based on a 5G QoS flow=5QI PDB+other 5G delay parameters (e.g., UE-DS-TT residence time)

Both the category "a" parameter and Category "b" are reported to the AF and relayed to the CNC so that CNC can read those parameters.

In this method 3, since CNC has both latency and throughput indicator of a link/5G QoS flow, the CNC can aggregate a proper amount of TSN streams into a traffic class per port pair based on the parameters provided by 5GS (i.e., the CNC can map a set of TSN streams to a TSN traffic class per port pair whereby it can ensure the cumulative traffic of those TSN streams do not exceed the throughput capacity of the corresponding 5G QoS flow per transmission instance on the radio interface).

Step 2:

During the bridge configuration phase, CNC provides QoS requirements to TSN AF and request for configuration.
   a. The bridge delay requirement can be mapped according to current TS23.501.
   b. The throughput (or burst size) of a TSN traffic class can be extracted. For example, by gate operation of IEEE8.201Qci (other alternatives can be possible). The IEEE 802.1Qci information can be provided from CNC to AF. AF can calculate the throughput/burst size of TSN streams or TSN traffic class, and then provides this information to other nodes of 5GS. Variation: AF can pass IEEE 802.1Qci information to other 5GS nodes, e.g., SMF, for calculation the throughput/burst size, and then distribute it.

Step 2b is optional in method 3, just for verifying purpose.

Step 3:

5GS finds a match between reported 5G QoS flow and TSN QoS requirements of a TSN traffic class, and then maps the TSN traffic class to the 5G QoS flow according to TS23.501.

An Example of the method 3 is shown in the figure.

Step1 Example:

5GS QoS capability report to AF:
1. Reported Bridge delay based on 5G QoS flow "x" is 10 ms=PDB (8 ms based on 5QI)+other 5G delay parameters (e.g., UE-DS-TT residence time)
2. MDBV of 5G QoS flow "x" is 1300 byte (or any other throughput indicator)

External Step (non-3GPP process):
CNC has TSN stream information.

| TSN stream1 | TSN stream2 | TSN stream3 | TSN stream4 | TSN stream5 | TSN stream6 |
|---|---|---|---|---|---|
| 100 | 340 | 300 | 360 | 360 | 140 |

CNC take inputs from 1 (bridge delay) and 2 (MDBV), and decides only TSN streams 2, 3, 4, 5 can be aggregated to Traffic class A of the related pair port, and CNC sends QoS characteristics of Traffic class A to TSN AF ask for bridge configuration.

Step2 (a) Example:
   QoS characteristics of Traffic class A:
   a. Bridge delay 10 ms, Step2 (b) Example:
   b. has burst size: 1300 byte.

Step 3:

5GS finds a match between reported 5G QoS flow and QoS requirements of a TSN traffic class, and then maps the TSN traffic class to the 5G QoS flow according to TS23.501.

Figure 8:
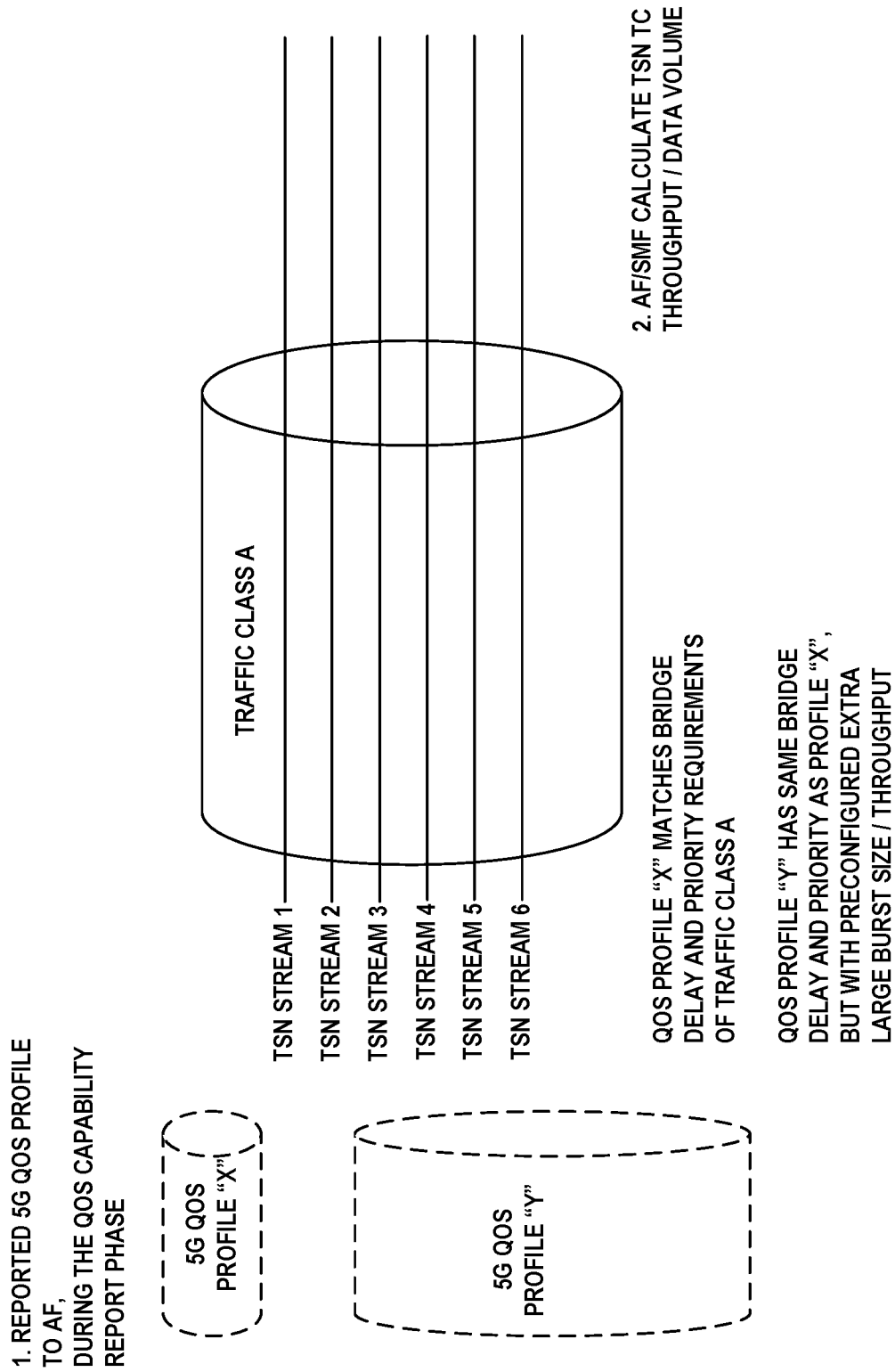
FIG. 8 illustrates preconfigured extra-large burst size 5G QoS profile, according to some embodiments of the present disclosure.

Method 4 includes preconfigured extra-large burst size 5G QoS profile. An example of this is illustrated in FIG. 8. During the capability report phase, report one or more QoS flows that have MDBV large enough to satisfy most of the TSN cases are reported to the AF.

Step 1:

During the capability report phase, certain available QoS flows with specific 5QIs are pre-selected for reporting. Those QoS flows characteristics can be divided into two categories.
   a. PDB value
   b. MDBV and others The parameters may be reported in other format, e.g., "bridge delay", "bitrate", etc. Or in combination of other parameters. E.g.,
   Reported Bridge delay based on a 5G QoS flow=5QI PDB+other 5G delay parameters (e.g., UE-DS-TT residence time)

Only the category "a" parameters are reported to AF, e.g., PDB is considered as part of Bridge delay. Category "b" although is part of QoS flow characteristics, but it is not provided to AF. Category "b" is used by 5GS internally.

For every reported QoS flow "x", create a new QoS flow "y" that has the same PDB value, but with a non-standard MDBV value. E.g., set MDBV to 13000 byte, or a value that is large enough to accommodate most of the TSN use cases. For example, a value is equivalent to a 1 Gbit/s Ethernet port throughput.

During the bridge configuration phase, CNC provides traffic class specific TSN QoS requirements to the AF and requests configuration of appropriate 5G QoS flow resources. Since the 5GS has already configured 5G QoS flow "y" that has a throughput/burst size (MDBV value) appropriate for the traffic class it does not need to create a new 5QI table entry with a new (custom) MDBV value that can satisfy the Traffic class throughput/burst size requirement (i.e., this Method 4 is faster than Method 2).

In such a way, 5GS maps the requirements of TSN Traffic class A into an already updated/configured QoS flow "y" that can always satisfy both latency and burst size/throughput requirements.

In some of the embodiments discussed above, in step 2, the AF can calculate the throughput/burst size of TSN streams or TSN traffic class, and then the AF provides this information to other 5GS nodes, e.g., PCF and/or SMF.

In some embodiments, if the QoS mapping is done by AF, then the MDBV value should be reported to AF (CNC either read the MDBV or not), then AF can request setup of 5G QoS profiles/flows with updated MDBV values.

If the QoS mapping is done by PCF, then the MDBV value of a QoS flow can remain in PCF, when PCF receives AF request for mapping a traffic class, PCF can find one or more suitable QoS flows for mapping a traffic class or a set of aggregated TSC streams.

In some embodiments, capacity can be one or more of: between an ingress and an egress port of the 5G system; a capacity of a PDU session; a capacity of a 5G QoS flow; and a capacity of a DRB.

In some embodiments, a PDU session has an Aggregated Maximum Bit Rate (AMBR), but it is only for Non-Guaranteed Bit Rate (GBR). For GBR, the capacity of the PDU session depends on QoS flows. In some embodiments, a DRB and its mapping with QoS flow is determined by the RAN and the CN might not be aware of the DRB information.

Figure 9:
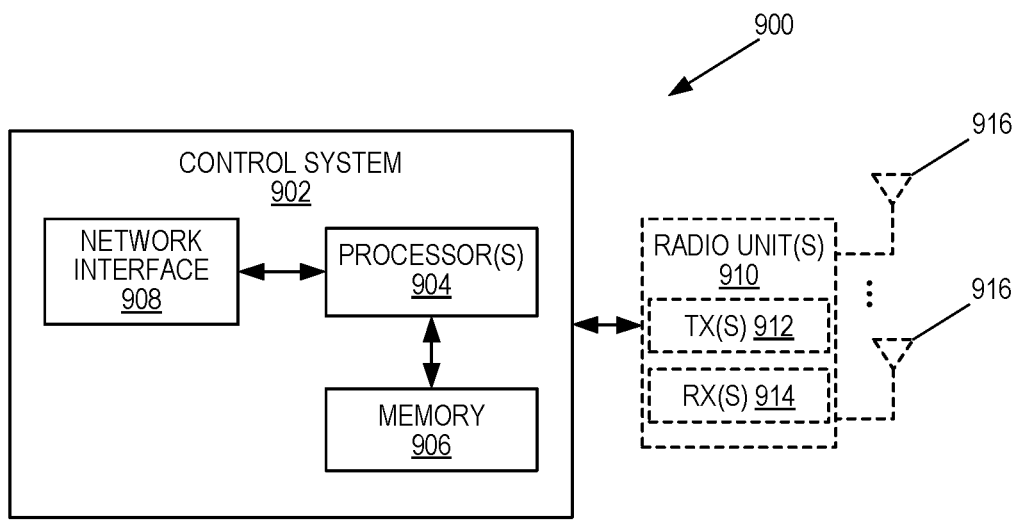
FIG. 9 is a schematic block diagram of a network node according to some embodiments of the present disclosure.

FIG. 9 is a schematic block diagram of a radio access node 900 according to some embodiments of the present disclosure. Optional features are represented by dashed boxes. The radio access node 900 may be, for example, a base station 202 or 206 or a network node that implements all or part of the functionality of the base station 202 or gNB described herein. As illustrated, the radio access node 900 includes a control system 902 that includes one or more processors 904 (e.g., Central Processing Units (CPUs), Application Specific Integrated Circuits (ASICs), Field Programmable Gate Arrays (FPGAs), and/or the like), memory 906, and a network interface 908. The one or more processors 904 are also referred to herein as processing circuitry. In addition, the radio access node 900 may include one or more radio units 910 that each includes one or more transmitters 912 and one or more receivers 914 coupled to one or more antennas 916. The radio units 910 may be referred to or be part of radio interface circuitry. In some embodiments, the radio unit(s) 910 is external to the control system 902 and connected to the control system 902 via, e.g., a wired connection (e.g., an optical cable). However, in some other embodiments, the radio unit(s) 910 and potentially the antenna(s) 916 are integrated together with the control system 902. The one or more processors 904 operate to provide one or more functions of a radio access node 900 as described herein. In some embodiments, the function(s) are implemented in software that is stored, e.g., in the memory 906 and executed by the one or more processors 904.

Figure 10:
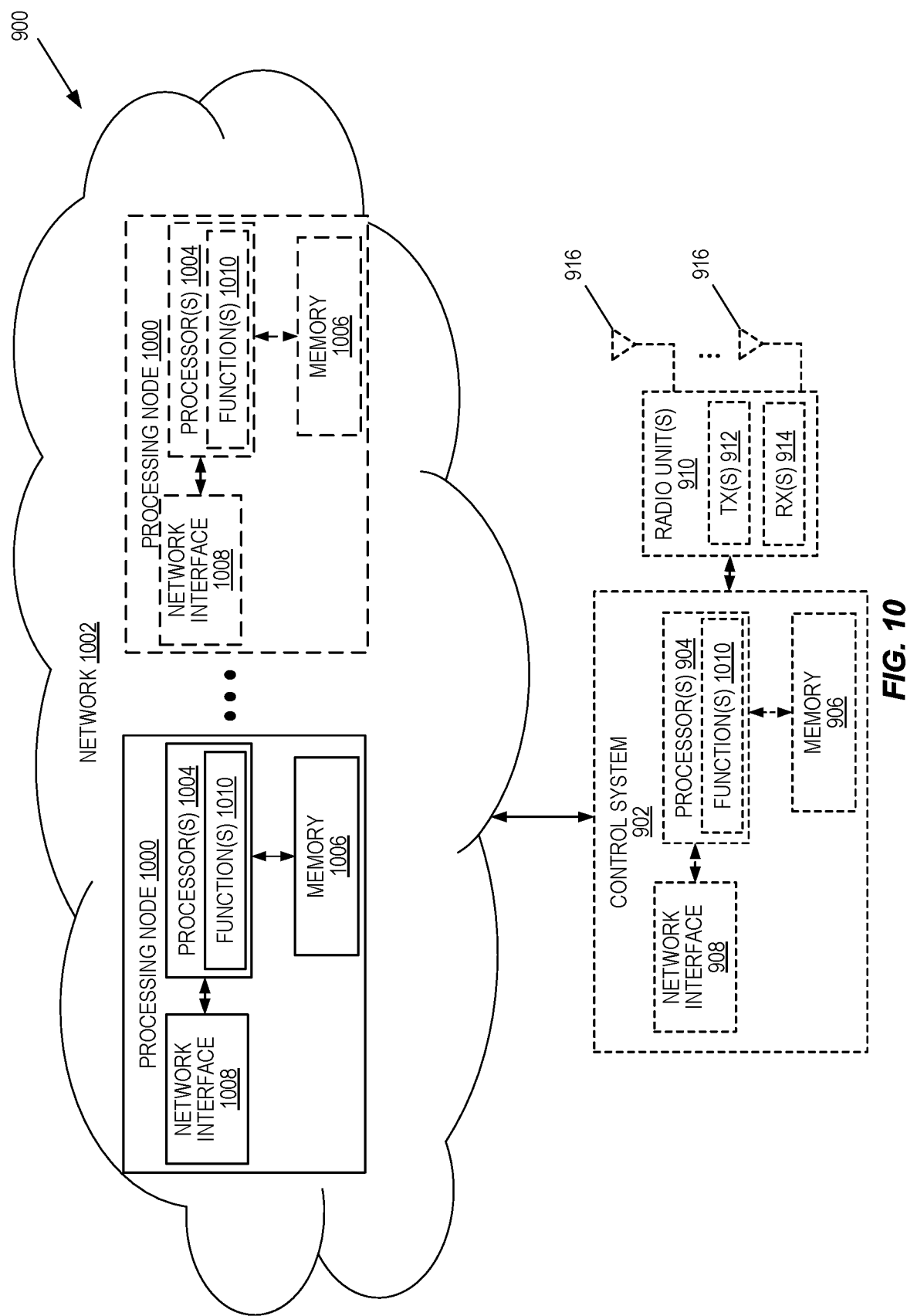
FIG. 10 is a schematic block diagram that illustrates a virtualized embodiment of the radio access node, according to some embodiments of the present disclosure.

FIG. 10 is a schematic block diagram that illustrates a virtualized embodiment of the radio access node 900 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 900 in which at least a portion of the functionality of the radio access node 900 is implemented as a virtual component(s) (e.g., via a virtual machine(s) executing on a physical processing node(s) in a network(s)). As illustrated, in this example, the radio access node 900 may include the control system 902 and/or the one or more radio units 910, as described above. The control system 902 may be connected to the radio unit(s) 910 via, for example, an optical cable or the like. The radio access node 900 includes one or more processing nodes 1000 coupled to or included as part of a network(s) 1002. If present, the control system 902 or the radio unit(s) are connected to the processing node(s) 1000 via the network 1002. Each processing node 1000 includes one or more processors 1004 (e.g., CPUs, ASICs, FPGAs, and/or the like), memory 1006, and a network interface 1008.

In this example, functions 1010 of the radio access node 900 described herein are implemented at the one or more processing nodes 1000 or distributed across the one or more processing nodes 1000 and the control system 902 and/or the radio unit(s) 910 in any desired manner. In some particular embodiments, some or all of the functions 1010 of the radio access node 900 described herein are implemented as virtual components executed by one or more virtual machines implemented in a virtual environment(s) hosted by the processing node(s) 1000. As will be appreciated by one of ordinary skill in the art, additional signaling or communication between the processing node(s) 1000 and the control system 902 is used in order to carry out at least some of the desired functions 1010. Notably, in some embodiments, the control system 902 may not be included, in which case the radio unit(s) 910 communicate directly with the processing node(s) 1000 via an appropriate network interface(s).

In some embodiments, a computer program including instructions which, when executed by at least one processor, causes the at least one processor to carry out the functionality of radio access node 900 or a node (e.g., a processing node 1000) implementing one or more of the functions 1010 of the radio access node 900 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 11:
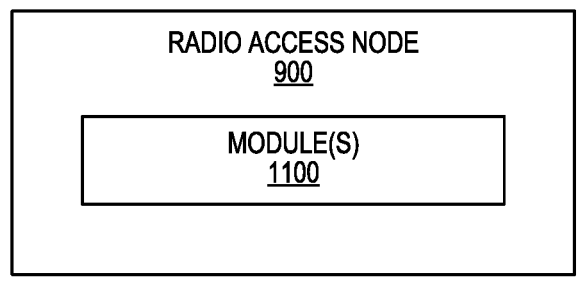
FIG. 11 is a schematic block diagram of the network node, according to some other embodiments of the present disclosure.

FIG. 11 is a schematic block diagram of the radio access node 900 according to some other embodiments of the present disclosure. The radio access node 900 includes one or more modules 1100, each of which is implemented in software. The module(s) 1100 provide the functionality of the radio access node 900 described herein. This discussion is equally applicable to the processing node 1000 of FIG. 10 where the modules 1100 may be implemented at one of the processing nodes 1000 or distributed across multiple processing nodes 1000 and/or distributed across the processing node(s) 1000 and the control system 902.

Figure 12:
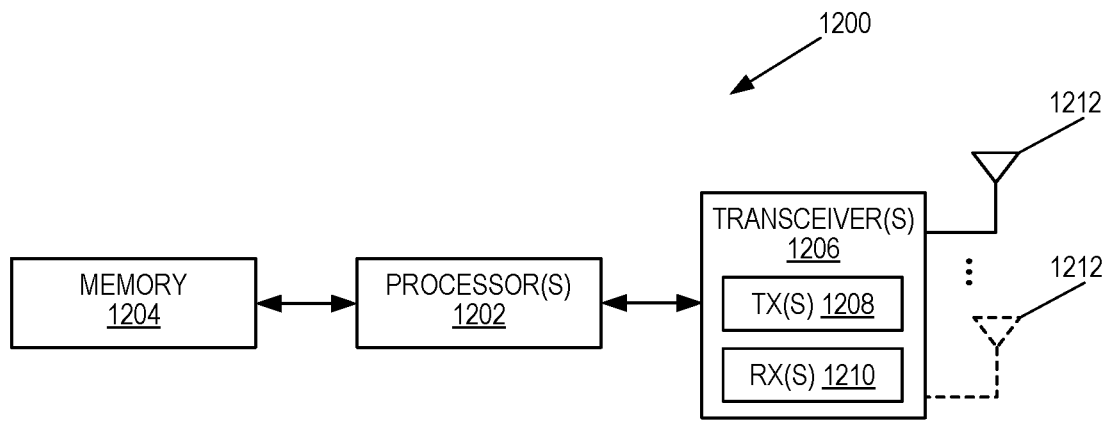
FIG. 12 is a schematic block diagram of a UE, according to some embodiments of the present disclosure.

FIG. 12 is a schematic block diagram of a wireless communication device 1200 according to some embodiments of the present disclosure. As illustrated, the wireless communication device 1200 includes one or more processors 1202 (e.g., CPUs, ASICs, FPGAs, and/or the like), memory 1204, and one or more transceivers 1206 each including one or more transmitters 1208 and one or more receivers 1210 coupled to one or more antennas 1212. The transceiver(s) 1206 includes radio-front end circuitry connected to the antenna(s) 1212 that is configured to condition signals communicated between the antenna(s) 1212 and the processor(s) 1202, as will be appreciated by on of ordinary skill in the art. The processors 1202 are also referred to herein as processing circuitry. The transceivers 1206 are also referred to herein as radio circuitry.

In some embodiments, the functionality of the wireless communication device 1200 described above may be fully or partially implemented in software that is, e.g., stored in the memory 1204 and executed by the processor(s) 1202. Note that the wireless communication device 1200 may include additional components not illustrated in FIG. 12 such as, e.g., one or more user interface components (e.g., an input/output interface including a display, buttons, a touch screen, a microphone, a speaker(s), and/or the like and/or any other components for allowing input of information into the wireless communication device 1200 and/or allowing output of information from the wireless communication device 1200), a power supply (e.g., a battery and associated power circuitry), etc.

In some embodiments, a computer program including instructions which, when executed by at least one processor, causes the at least one processor to carry out the functionality of the wireless communication device 1200 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 13:
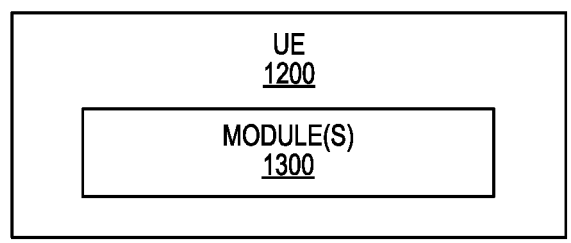
FIG. 13 is a schematic block diagram of the UE, according to some embodiments of the present disclosure.

FIG. 13 is a schematic block diagram of the wireless communication device 1200 according to some other embodiments of the present disclosure. The wireless communication device 1200 includes one or more modules 1300, each of which is implemented in software. The module(s) 1300 provide the functionality of the wireless communication device 1200 described herein.

Figure 14:
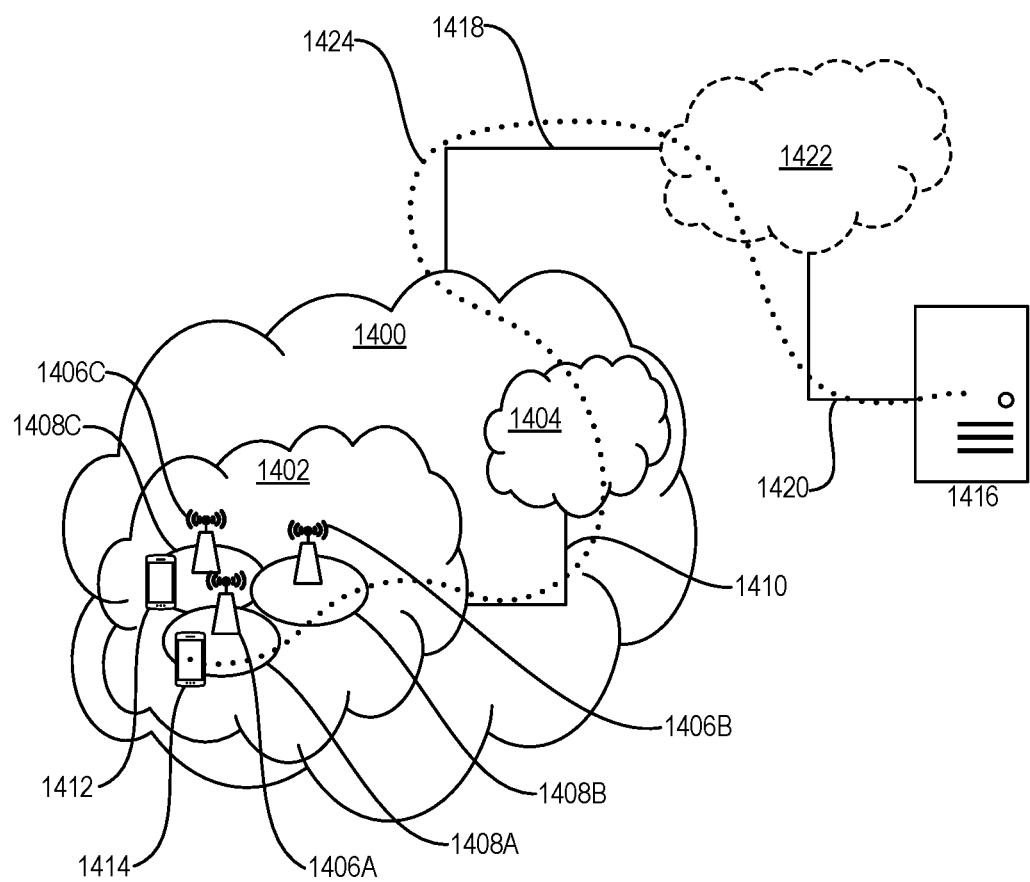
FIGS. 14 and 15 illustrate examples of a cellular communications system, according to some embodiments of the present disclosure.

With reference to FIG. 14, in accordance with an embodiment, a communication system includes a telecommunication network 1400, such as a 3GPP-type cellular network, which comprises an access network 1402, such as a RAN, and a core network 1404. The access network 1402 comprises a plurality of base stations 1406A, 1406B, 1406C, such as Node Bs, eNBs, gNBs, or other types of wireless Access Points (APs), each defining a corresponding coverage area 1408A, 1408B, 1408C. Each base station 1406A, 1406B, 1406C is connectable to the core network 1404 over a wired or wireless connection 1410. A first UE 1412 located in coverage area 1408C is configured to wirelessly connect to, or be paged by, the corresponding base station 1406C. A second UE 1414 in coverage area 1408A is wirelessly connectable to the corresponding base station 1406A. While a plurality of UEs 1412, 1414 are illustrated in this example, the disclosed embodiments are equally applicable to a situation where a sole UE is in the coverage area or where a sole UE is connecting to the corresponding base station 1406.

The telecommunication network 1400 is itself connected to a host computer 1416, which may be embodied in the hardware and/or software of a standalone server, a cloud-implemented server, a distributed server, or as processing resources in a server farm. The host computer 1416 may be under the ownership or control of a service provider, or may be operated by the service provider or on behalf of the service provider. Connections 1418 and 1420 between the telecommunication network 1400 and the host computer 1416 may extend directly from the core network 1404 to the host computer 1416 or may go via an optional intermediate network 1422. The intermediate network 1422 may be one of, or a combination of more than one of, a public, private, or hosted network; the intermediate network 1422, if any, may be a backbone network or the Internet; in particular, the intermediate network 1422 may comprise two or more sub-networks (not shown).

The communication system of FIG. 14 as a whole enables connectivity between the connected UEs 1412, 1414 and the host computer 1416. The connectivity may be described as an Over-the-Top (OTT) connection 1424. The host computer 1416 and the connected UEs 1412, 1414 are configured to communicate data and/or signaling via the OTT connection 1424, using the access network 1402, the core network 1404, any intermediate network 1422, and possible further infrastructure (not shown) as intermediaries. The OTT connection 1424 may be transparent in the sense that the participating communication devices through which the OTT connection 1424 passes are unaware of routing of uplink and downlink communications. For example, the base station 1406 may not or need not be informed about the past routing of an incoming downlink communication with data originating from the host computer 1416 to be forwarded (e.g., handed over) to a connected UE 1412. Similarly, the base station 1406 need not be aware of the future routing of an outgoing uplink communication originating from the UE 1412 towards the host computer 1416.

Example implementations, in accordance with an embodiment, of the UE, base station, and host computer discussed in the preceding paragraphs will now be described with reference to FIG. 15. In a communication system 1500, a host computer 1502 comprises hardware 1504 including a communication interface 1506 configured to set up and maintain a wired or wireless connection with an interface of a different communication device of the communication system 1500. The host computer 1502 further comprises processing circuitry 1508, which may have storage and/or processing capabilities. In particular, the processing circuitry 1508 may comprise one or more programmable processors, ASICs, FPGAs, or combinations of these (not shown) adapted to execute instructions. The host computer 1502 further comprises software 1510, which is stored in or accessible by the host computer 1502 and executable by the processing circuitry 1508. The software 1510 includes a host application 1512. The host application 1512 may be operable to provide a service to a remote user, such as a UE 1514 connecting via an OTT connection 1516 terminating at the UE 1514 and the host computer 1502. In providing the service to the remote user, the host application 1512 may provide user data which is transmitted using the OTT connection 1516.

The communication system 1500 further includes a base station 1518 provided in a telecommunication system and comprising hardware 1520 enabling it to communicate with the host computer 1502 and with the UE 1514. The hardware 1520 may include a communication interface 1522 for setting up and maintaining a wired or wireless connection with an interface of a different communication device of the communication system 1500, as well as a radio interface 1524 for setting up and maintaining at least a wireless connection 1526 with the UE 1514 located in a coverage area (not shown in FIG. 15) served by the base station 1518. The communication interface 1522 may be configured to facilitate a connection 1528 to the host computer 1502. The connection 1528 may be direct or it may pass through a core network (not shown in FIG. 15) of the telecommunication system and/or through one or more intermediate networks outside the telecommunication system. In the embodiment shown, the hardware 1520 of the base station 1518 further includes processing circuitry 1530, which may comprise one or more programmable processors, ASICs, FPGAs, or combinations of these (not shown) adapted to execute instructions. The base station 1518 further has software 1532 stored internally or accessible via an external connection.

The communication system 1500 further includes the UE 1514 already referred to. The UE's 1514 hardware 1534 may include a radio interface 1536 configured to set up and maintain a wireless connection 1526 with a base station serving a coverage area in which the UE 1514 is currently located. The hardware 1534 of the UE 1514 further includes processing circuitry 1538, which may comprise one or more programmable processors, ASICs, FPGAs, or combinations of these (not shown) adapted to execute instructions. The UE 1514 further comprises software 1540, which is stored in or accessible by the UE 1514 and executable by the processing circuitry 1538. The software 1540 includes a client application 1542. The client application 1542 may be operable to provide a service to a human or non-human user via the UE 1514, with the support of the host computer 1502. In the host computer 1502, the executing host application 1512 may communicate with the executing client application 1542 via the OTT connection 1516 terminating at the UE 1514 and the host computer 1502. In providing the service to the user, the client application 1542 may receive request data from the host application 1512 and provide user data in response to the request data. The OTT connection 1516 may transfer both the request data and the user data. The client application 1542 may interact with the user to generate the user data that it provides.

Figure 15:
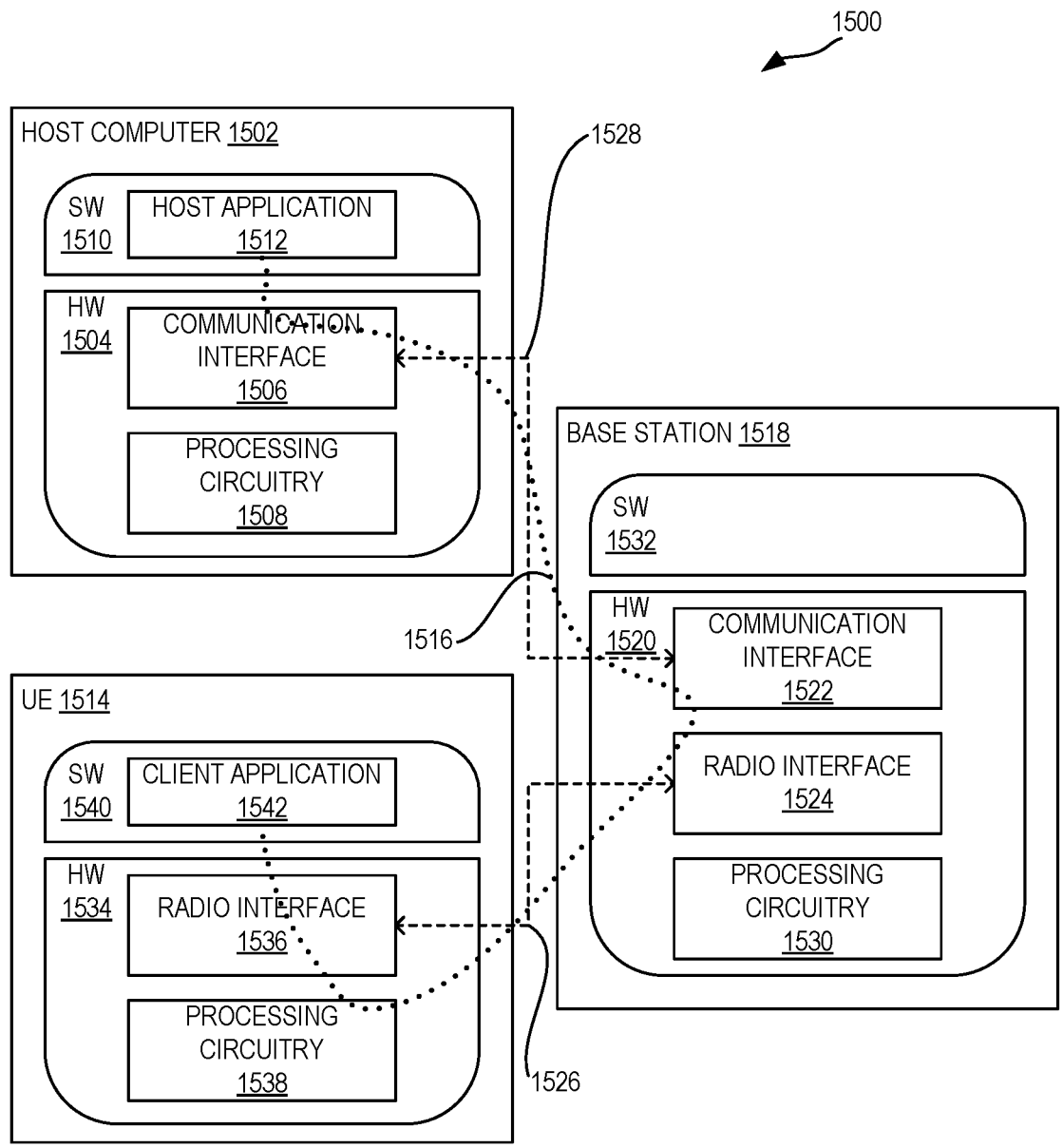

It is noted that the host computer 1502, the base station 1518, and the UE 1514 illustrated in FIG. 15 may be similar or identical to the host computer 1416, one of the base stations 1406A, 1406B, 1406C, and one of the UEs 1412, 1414 of FIG. 14, respectively. This is to say, the inner workings of these entities may be as shown in FIG. 15 and independently, the surrounding network topology may be that of FIG. 14.

In FIG. 15, the OTT connection 1516 has been drawn abstractly to illustrate the communication between the host computer 1502 and the UE 1514 via the base station 1518 without explicit reference to any intermediary devices and the precise routing of messages via these devices. The network infrastructure may determine the routing, which may be configured to hide from the UE 1514 or from the service provider operating the host computer 1502, or both. While the OTT connection 1516 is active, the network infrastructure may further take decisions by which it dynamically changes the routing (e.g., on the basis of load balancing consideration or reconfiguration of the network).

The wireless connection 1526 between the UE 1514 and the base station 1518 is in accordance with the teachings of the embodiments described throughout this disclosure. One or more of the various embodiments improve the performance of OTT services provided to the UE 1514 using the OTT connection 1516, in which the wireless connection 1526 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 1516 between the host computer 1502 and the UE 1514, in response to variations in the measurement results. The measurement procedure and/or the network functionality for reconfiguring the OTT connection 1516 may be implemented in the software 1510 and the hardware 1504 of the host computer 1502 or in the software 1540 and the hardware 1534 of the UE 1514, or both. In some embodiments, sensors (not shown) may be deployed in or in association with communication devices through which the OTT connection 1516 passes; the sensors may participate in the measurement procedure by supplying values of the monitored quantities exemplified above, or supplying values of other physical quantities from which the software 1510, 1540 may compute or estimate the monitored quantities. The reconfiguring of the OTT connection 1516 may include message format, retransmission settings, preferred routing, etc.; the reconfiguring need not affect the base station 1518, and it may be unknown or imperceptible to the base station 1518. Such procedures and functionalities may be known and practiced in the art. In certain embodiments, measurements may involve proprietary UE signaling facilitating the host computer 1502's measurements of throughput, propagation times, latency, and the like. The measurements may be implemented in that the software 1510 and 1540 causes messages to be transmitted, in particular empty or 'dummy' messages, using the OTT connection 1516 while it monitors propagation times, errors, etc.

Figures 16, 17:
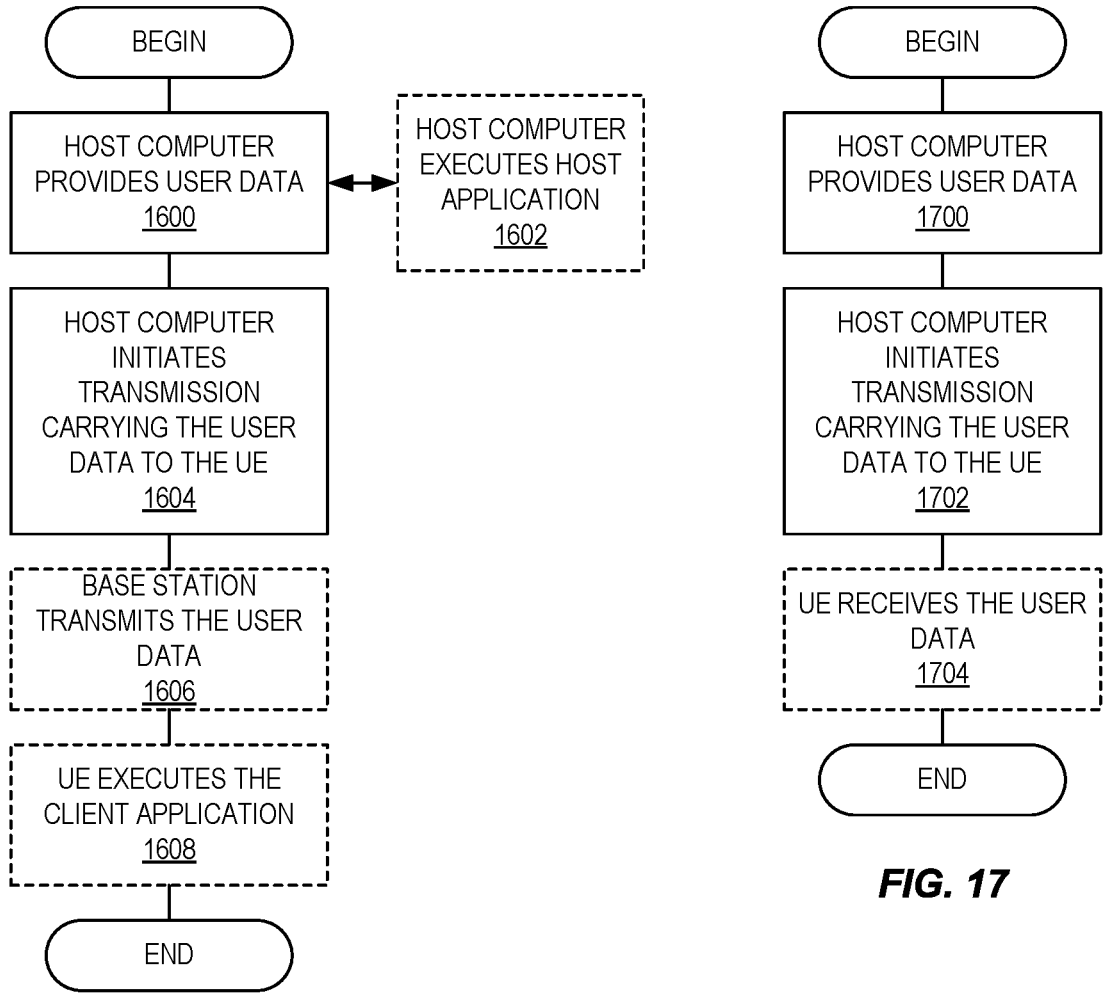
FIGS. 16 through 19 are flowcharts illustrating methods implemented in a communication system, according to some embodiments of the present disclosure.

FIG. 16 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 16 will be included in this section. In step 1600, the host computer provides user data. In sub-step 1602 (which may be optional) of step 1600, the host computer provides the user data by executing a host application. In step 1604, the host computer initiates a transmission carrying the user data to the UE. In step 1606 (which may be optional), the base station transmits to the UE the user data which was carried in the transmission that the host computer initiated, in accordance with the teachings of the embodiments described throughout this disclosure. In step 1608 (which may also be optional), the UE executes a client application associated with the host application executed by the host computer.

FIG. 17 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 17 will be included in this section. In step 1700 of the method, the host computer provides user data. In an optional sub-step (not shown) the host computer provides the user data by executing a host application. In step 1702, the host computer initiates a transmission carrying the user data to the UE. The transmission may pass via the base station, in accordance with the teachings of the embodiments described throughout this disclosure. In step 1704 (which may be optional), the UE receives the user data carried in the transmission.

Figures 18, 19:
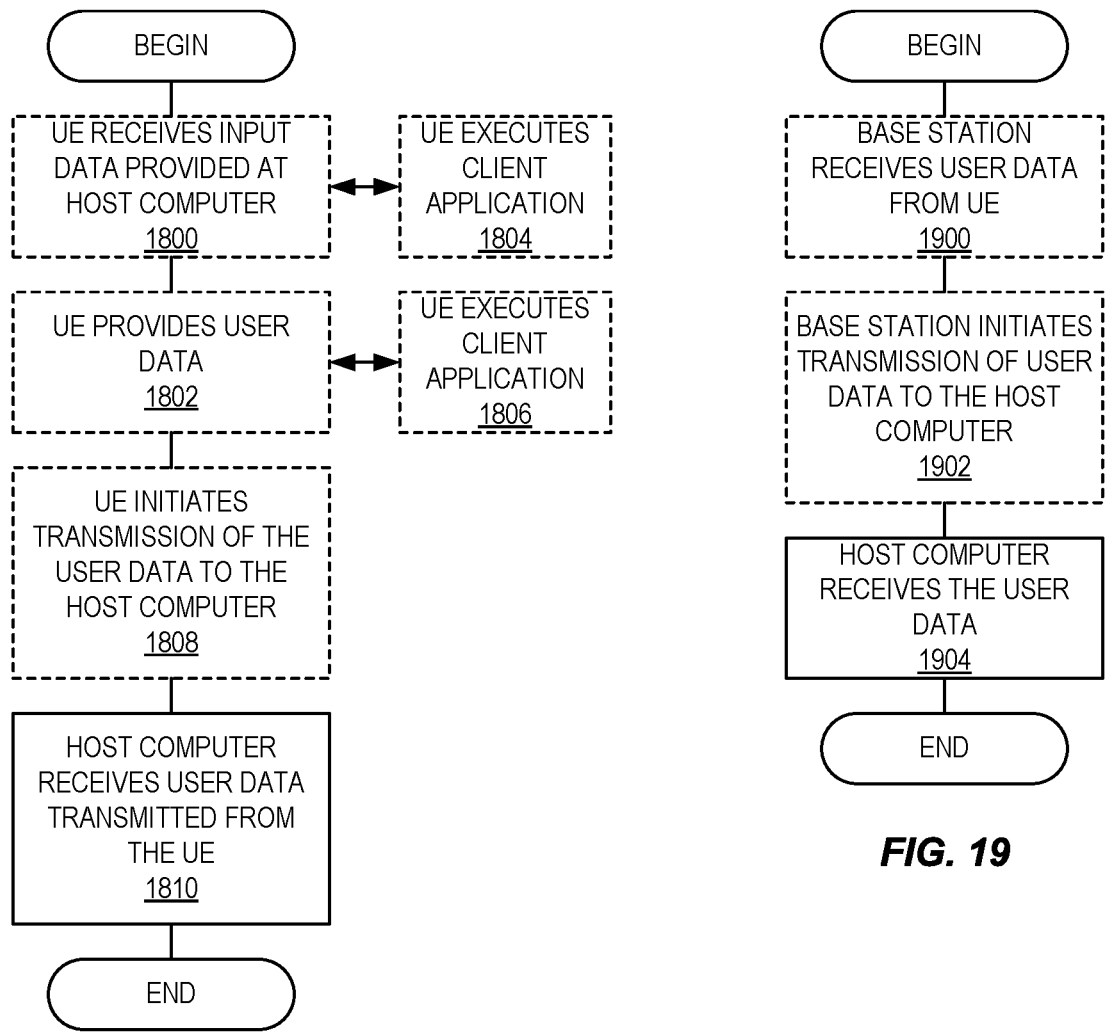

FIG. 18 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 18 will be included in this section. In step 1800 (which may be optional), the UE receives input data provided by the host computer. Additionally or alternatively, in step 1802, the UE provides user data. In sub-step 1804 (which may be optional) of step 1800, the UE provides the user data by executing a client application. In sub-step 1806 (which may be optional) of step 1802, the UE executes a client application which provides the user data in reaction to the received input data provided by the host computer. In providing the user data, the executed client application may further consider user input received from the user. Regardless of the specific manner in which the user data was provided, the UE initiates, in sub-step 1808 (which may be optional), transmission of the user data to the host computer. In step 1810 of the method, the host computer receives the user data transmitted from the UE, in accordance with the teachings of the embodiments described throughout this disclosure.

FIG. 19 is a flowchart illustrating a method implemented in a communication system, in accordance with one embodiment. The communication system includes a host computer, a base station, and a UE which may be those described with reference to FIGS. 14 and 15. For simplicity of the present disclosure, only drawing references to FIG. 19 will be included in this section. In step 1900 (which may be optional), in accordance with the teachings of the embodiments described throughout this disclosure, the base station receives user data from the UE. In step 1902 (which may be optional), the base station initiates transmission of the received user data to the host computer. In step 1904 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

MDBV identifies the maximum cumulative payload (from all TSN streams that map to a TSN traffic class and its corresponding 5G QoS flow) that can be sent per instance of traffic transmission over the radio interface for any given 5G QoS flow and therefore limits the throughput of a QoS flow.

At the 5GS QoS capability report phase, currently MDBV is not part of QoS capability report (sent to the AF), and it is not part of minimum set of TSN QoS-related parameters for QoS mapping either. Although MDBV is part of 5QI, but only the bridge delay and priority related parameters are reported to AF during the QoS capability report phase.

The mapping of a TSC traffic class or TSC streams to a 5G QoS flow requires to match bridge delay, priority, and MDBV in the same time. During the capability report phase, the MDBV value of a reported 5QI has been decided already. There is a risk that the maximum value of TSC burst size of a traffic class (aggregated TSC streams) is larger than any reported MDBV of 5QIs. Therefore, it is not possible to find a 5QI that matches MDBV and in the same time also matches bridge delay and priority requirements for the corresponding traffic class.

If AF doesn't provide TSC burst size information, the default value for the TSC 5QI may not be enough to accommodate aggregated TSC streams.

In case the Maximum Burst Size of the aggregated TSC streams in the traffic class is provided by CNC via TSN AF to PCF, PCF can derive the required MDBV taking the Maximum Burst Size and TSCAI as input. If the default MDBV associated with a 5QI in the QoS mapping table can't satisfy the aggregated TSC Burst Size, the PCF provides the derived MDBV in the PCC rule and then the SMF performs QoS Flow binding as specified in 6.1.3.2.4 of TS 23.503 [45].

The mapping tables between the traffic class and 5GS QoS Profile is provisioned and further used to find suitable 5GS QoS profile to transfer TSN traffic over the PDU Session. QoS mapping procedures are performed in two phases: (1) QoS capability report phase as described in clause 5.28.1, and (2) QoS configuration phase as in clause 5.28.2

(1) The TSN Translator AF shall be pre-configured via OAM the mapping table and represents what is being reported or exposed to the TSN system (i.e. the CNC) through the relevant TSN information objects, such as the Traffic Class Table for every port, see the IEEE 802.1Q [X] and IEEE 802.1Qcc [95].

(2) CNC distributes the TSN QoS requirements and TSN scheduling parameters (specific for current node) to 5G virtual bridge via TSN AF. Alternatively, the 5GS virtual bridge may pre-request or query CNC for the TSN QoS and traffic information.

The PCF mapping table provides a mapping from TSN QoS information to 5GS QoS profile. Based on trigger from TSN AF, the PCF may trigger PDU session modification procedure to establish a new 5G QoS flow for the requested traffic class according to the selected QoS policies from the TSN AF traffic requirements.

The minimum set of TSN QoS-related parameters that are relevant for mapping the TSN QoS requirements in the 5GS are: traffic classes and their priorities per port, bridge delays per port pair and traffic class (independentDelayMax, independentDelayMin, dependentDelayMax, dependentDelayMin), and propagation delay per port (txPropagationDelay).

QoS mapping table between port traffic classes and 5QI should be matching the delay and priority, while preserving the priorities in the 5GS. An operator enabling TSN services via 5GS can choose up to eight traffic classes to be mapped to 5GS QoS profiles.

Once the 5QIs to be used for TSN streams are identified, then it is possible to enumerate as many bridge port traffic classes as the number of selected 5QIs.

Once the CNC has received the necessary information, it proceeds to calculate scheduling and paths. The configuration information is then set in the bridge per port and per traffic class. The most relevant information received is the scheduling for every traffic class and port of the bridge. At this point, it is possible to retrieve the real QoS requirements by identifying the traffic class of the port. Then the traffic class to 5QI mapping can be performed using the QoS mapping table in the TSN AF. Subsequently, the TSC QoS flow can be configured using the 5QI retrieved from the QoS mapping table. This feedback approach uses the reported information to the CNC and the feedback of the configuration information coming from the CNC to perform the mapping and configuration in the 5GS. The scheduling configuration information per traffic class is mapped to trigger creation/modification of a QoS flow in 5GS.

In case the Maximum Burst Size of the aggregated TSC streams in the traffic class is provided by CNC via TSN AF to PCF, PCF can derive the required MDBV taking the Maximum Burst Size and TSCAI as input. If the default MDBV associated with a 5QI in the QoS mapping table can't satisfy the aggregated TSC Burst Size, the PCF provides the derived MDBV in the PCC rule and then the SMF performs QoS Flow binding as specified in 6.1.3.2.4 of TS 23.503 [45].

In case the Maximum Burst Size of the aggregated TSC streams in the traffic class is provided by CNC via TSN AF, PCF can derive the required MDBV of the allocated QoS flow. If the MDBV configured in the QoS mapping can't match the aggregated Burst Size, a QoS flow with customized MDBV or even multiple QoS flows may be configured for the traffic class.

Npcf and Naf enable transport of application level session information and Ethernet port management information from AF to PCF. Such information includes, but is not limited to:
IP filter information or Ethernet packet filter information to identify the service data flow for policy control and/or differentiated charging;
Media/application bandwidth requirements for QoS control;
In addition, for sponsored data connectivity:
the sponsor's identification;
optionally, a usage threshold and whether the PCF reports these events to the AF;
information identifying the application service provider and application (e.g. SDFs, application identifier, etc.);
information required to enable Application Function influence on traffic routing as defined in clause 5.6.7 of TS 23.501 [2];
information required to enable setting up an AF session with required QoS as defined in clause 6.1.3.22.
TSN AF provides burst arrival time (in reference to TSN GM), periodicity, flow direction, and aggregated TSC Burst Size needed for TSCAI determination (as described in clauses 5.27 and 5.28 of TS 23.501 [2]).
Npcf and Naf enable the AF subscription to notifications on PDU Session events, i.e. the events requested by the AF as described in clause 6.1.3.18 and the change of DNAI as defined in clause 5.6.7 of TS 23.501 [2].

The N5 reference point is defined for the interactions between PCF and AF in the reference point representation.

The PCF shall accept input for PCC decision-making from the SMF, the AMF, the CHF, the NWDAF if present, the UDR and if the AF is involved, from the AF, as well as the PCF may use its own predefined information. These different nodes should provide as much information as possible to the PCF. At the same time, the information below describes examples of the information provided. Depending on the particular scenario all the information may not be available or is already provided to the PCF.

The AMF may provide the following information: SUPI; The PEI of the UE; Location of the subscriber; Service Area Restrictions; RFSP Index; RAT Type; GPSI; Access Type; Serving Network identifier (PLMN ID or PLMN ID and NID, see clause 5.34 of TS 23.501 [2]); Allowed NSSAI; UE time zone; Subscribed UE-AMBR; Mapping Of Allowed NSSAI; S-NSSAI for the PDU Session; Requested DNN.

NOTE 1: The Access Type and RAT Type parameters should allow extension to include new types of accesses.

The UE may provide the following information: OSId; List of PSIs; Indication of UE support for AN DSP.

The SMF may provide the following information: SUPI; The PEI of the UE; IPv4 address of the UE; IPv6 network prefix assigned to the UE; Default 5QI and default ARP; Request type (initial, modification, etc.); Type of PDU Session (IPv4, IPv6, IPv4v6, Ethernet, Unstructured); Access Type; RAT Type; GPSI; Internal-Group Identifier—

Location of the subscriber; S-NSSAI; NSI-ID (if available); DNN; Serving Network identifier (PLMN ID or PLMN ID and NID, see clause 5.34 of TS 23.501 [2]); Application identifier; Allocated application instance identifier; Detected service data flow descriptions; UE support of reflective QoS (as defined in clause 5.7.5.1 of TS 23.501 [2]); Number of supported packet filters for signalled QoS rules (indicated by the UE as defined in clause 5.7.5.1 of TS 23.501 [2]); 3GPP PS Data Off status; DN Authorization Profile Index (see clause 5.6.6 of TS 23.501 [2]); Session AMBR (see clause 5.6.6 of TS 23.501 [2]).

The UDR may provide the information for a subscriber connecting to a specific DNN and S-NSSAI, as described in the sub clause 6.2.1.3.

The UDR may provide the following policy information related to an ASP: The ASP identifier; A transfer policy together with a Background Data Transfer Reference ID, the volume of data to be transferred per UE, the expected amount of UEs.

NOTE 2: The information related with AF influence on traffic routing may be provided by UDR when the UDR serving the NEF is deployed and stores the application request.

The AF, if involved, may provide the following application session related information directly or via NEF, e.g. based on SIP and SDP: Subscriber Identifier; IP address of the UE; Media Type; Media Format, e.g. media format sub-field of the media announcement and all other parameter information (a=lines) associated with the media format; Bandwidth; Sponsored data connectivity information; Flow description, e.g. source and destination IP address and port numbers and the protocol; AF application identifier; AF-Service-Identifier, or alternatively, DNN and possibly S-NSSAI AF Communication Service Identifier (e.g. IMS Communication Service Identifier), UE provided via AF; AF Application Event Identifier; AF Record Information; Flow status (for gating decision); Priority indicator, which may be used by the PCF to guarantee service for an application session of a higher relative priority; NOTE 3: The AF Priority information represents session/application priority and is separate from the MPS 5GS Priority indicator.

Emergency indicator; Application service provider; DNAI; Information about the N6 traffic routing requirements; GPSI; Internal-Group Identifier; Temporal validity condition; Spatial validity condition; AF subscription for early and/or late notifications about UP management events; AF transaction identifier; TSN AF Parameters: Burst Arrival Time in reference to TSN GM; Periodicity in reference to TSN GM; Flow direction; Delay Requirement in reference to TSN GM; Maximum Burst Size.

The AF may provide the following background data transfer related information via NEF: Background Data Transfer Reference ID. Background Data Transfer Policy. Volume per UE. Number of UEs. Desired time window. Network Area Information.

The CHF, if involved, may provide the following information for a subscriber:

Policy counter status for each relevant policy counter.

The NWDAF, if involved, may provide analytics information as described in clause 6.1.1.3.

In addition, the predefined information in the PCF may contain additional rules based on charging policies in the network, whether the subscriber is in its home network or roaming, depending on the QoS Flow attributes.

The 5QIs (see clause 5.7.4 of TS 23.501 [2]) in the PCC rule is derived by the PCF from AF or UDR interaction if available. The input can be SDP information or other available application information, in line with operator policy.

The Allocation and Retention Priority in the PCC Rule is derived by the PCF from AF or UDR interaction if available, in line with operator policy.

TS 23.501 clause 5.28.4,

"QoS mapping procedures are performed in two phases: (1) QoS capability report phase as described in clause 5.28.1, and (2) QoS configuration phase as in clause 5.28.2"

"Based on trigger from TSN AF, the PCF may trigger PDU session modification procedure to establish a new 5G QoS flow for the requested traffic class according to the selected QoS policies from the TSN AF traffic requirements."

The minimum set of TSN QoS-related parameters that are relevant for mapping the TSN QoS requirements in the 5GS are: traffic classes and their priorities per port, bridge delays per port pair and traffic class (independentDelayMax, independentDelayMin, dependentDelayMax, dependentDelayMin), and propagation delay per port (txPropagationDelay).

Observation 1: MDBV is not part of QoS capability report (sent to the AF), and it is not part of minimum set of TSN QoS-related parameters for QoS mapping either.

Observation 2: Although MDBV is part of 5QI, but only the bridge delay and priority related parameters are reported to AF during the QoS capability report phase.

TS 23.501 clause 5.27.2 "The maximum value of TSC Burst Size should be mapped to a 5QI with MDBV that is equal or higher. This 5QI also shall have a PDB value that satisfies the bridge delay capabilities reported for the corresponding traffic class.

For TSC QoS Flows, MDBV (described in clause 5.7.3.7) is set to the Maximum Burst Size of the aggregated TSC streams to be allocated to this QoS Flow. If the AF does not provide a TSC Burst Size for aggregated TSC streams, then the MDBV is set to the default value for the TSC 5QI of the corresponding traffic class.

S2-1910758 has agreed that "For each instance of Periodicity, within each Period (defined by periodicity value), TSC QoS Flows are required to transmit only one burst of maximum size MDBV within the AN-PDB."

Observation 3: The mapping of a TSC traffic class or TSC streams to a 5G QoS flow requires to match bridge delay, priority, and MDBV in the same time. During the capability report phase, the MDBV value of a reported 5QI has been decided already. There is a risk that the maximum value of TSC burst size of a traffic class (aggregated TSC streams) is larger than any reported MDBV of 5QIs. Therefore, it is not possible to find a 5QI that matches MDBV and in the same time also matches bridge delay and priority requirements for the corresponding traffic class.

Observation 4: If AF doesn't provide TSC burst size information, the default value for the TSC 5QI may not be enough to accommodate aggregated TSC streams.

There are scenarios when the reported 5G QoS flows (during the capability report phase) can matches burst size requirement of a traffic class. 5GS keeps one to one mapping between a TSN traffic class a 5G QoS flow.

During the capability report phase, certain available QoS flows with specific 5QIs are pre-selected for report. Some of the QoS flows characteristics (e.g. PDB, as part of bridge delay) are reported to AF. Other QoS characteristics (e.g. MDBV) are not provided to AF.

During the bridge configuration phase (TS 23.501 clause 5.28.2), CNC provides bridge configuration information to TSN AF and request for configuration. The burst size of a TSN traffic class can be extracted, for example, by gate operation of IEEE802.11Qci. The 802.1Qci information can be provided from CNC to AF. AF can calculate the burst size of the TSN traffic class, and then provides this information to PCF and/or SMF.

According to the throughput/burst size of every TSN streams of a traffic class, 5GS can search for available QoS flows that have already reported to AF and have bridge delay, priority matches the traffic class requirements. If the reported QoS flow can't match the bridge delay, priority and burst size requirements of the traffic class. 5GS can update/create a new QoS flow with a 5QI with a new (custom) MDBV value that can satisfy the burst size requirement of the traffic class.

Option 1: a traffic class is broken down into subgroups.

There are scenarios when there is no any reported 5G QoS flows (during the capability report phase) can matches the TSC burst size requirement of a Traffic class. A traffic class can be broken down into several multiple subgroups, and matched into multiple reported QoS flows.

During the capability report phase (TS 23.501 clause 5.28.1), certain available QoS flows with specific 5QIs are pre-selected for report. Some of the QoS flows characteristics (e.g. PDB, as part of bridge delay) are reported to AF. Other QoS characteristics (e.g. MDBV) are not provided to AF.

During the bridge configuration phase (TS 23.501 clause 5.28.2), CNC provides bridge configuration information to TSN AF and request for configuration. The burst size of a TSN traffic class and/or burst size of every TSN stream inside the TSN traffic class can be extracted, for example, by gate operation of IEEE802.11Qci. The 802.1Qci information can be provided from CNC to AF. AF can calculate the burst size of TSN streams or TSN traffic class, and then provides this information to PCF and/or SMF.

5GS can search for available QoS flows that have already reported to AF and have bridge delay, priority matches the traffic class requirements. Then according to the extracted burst size information of a traffic class and every TSN streams, each TSN traffic class can then be organized into several subgroups, so that the TSN streams in each subgroup can be successfully mapped to a 5G QoS flow specific MDBV value that can be supported by the 5G system.

Proposal: In case the Maximum Burst Size of the aggregated TSC streams in the traffic class is provided by CNC via TSN AF, PCF can derive the required MDBV of the allocated QoS flow. If the MDBV configured in the QoS mapping can't match the aggregated Burst Size, a QoS flow with customized MDBV or even multiple QoS flows may be configured for the traffic class.

EMBODIMENTS

Group A Embodiments

Embodiment 1: A method performed by a first node for mapping Time-Sensitive Networking, TSN, streams, the method comprising one or more of: receiving traffic class specific information for one or more TSN streams; and determining a set of one or more 5G Quality of Service, QoS, flows to support the traffic class.

Embodiment 2: The method of embodiment 1 wherein receiving the traffic class specific information for the one or more TSN streams comprises receiving traffic class specific Packet Delay Budget, PDB, and maximum payload volume per transmission instance for each TSN stream in that traffic class.

Embodiment 3: The method of any of the previous embodiments, comprising one or more of: establishing a set of 5G QoS Identifier, 5QI, table entries for which different values are determined independent of knowing which TSN streams will map to any given traffic class; upon receiving TSN traffic class specific information, mapping the corresponding TSN streams into subgroups where each subgroup is supported by a common 5G QoS flow.

Embodiment 4: The method of embodiment 3 wherein the different values comprise different values for one or more of the PDB and Maximum Data Burst Volume, MDBV, attributes.

Embodiment 5: The method of any of embodiments 3 to 4 wherein each 5G QoS flow used to support a subgroup is selected such that it ensures the PDB requirement and maximum payload volume per transmission instance of the corresponding subgroup is satisfied.

Embodiment 6: The method of any of embodiments 3 to 5 comprising ensuring that all TSN streams in each subgroup associated with any given TSN traffic class are efficiently supported using multiple 5G QoS flows.

Embodiment 7: The method of any of embodiments 3 to 6 wherein the radio interface bandwidth allocated in support of each 5G QoS flow can be made equal to or slightly larger than the actual bandwidth requirements of the subgroup of TSN streams supported thereon.

Embodiment 8: The method of any of embodiments 3 to 7, comprising: upon receiving TSN traffic class specific information, configuring one or more new 5QI table entries wherein each has an appropriate PDB attribute and MDBV attributes that, when considered together, provide a value large enough to support maximum payload volume per transmission instance for all TSN streams comprising that TSN traffic class.

Embodiment 9: The method of embodiment 8 comprising ensuring that all TSN streams associated with any given TSN traffic class are efficiently supported using one or more 5G QoS flows.

Embodiment 10: The method of embodiment 9 wherein the radio interface bandwidth allocated in support of the one or more 5G QoS flows can be made equal to or slightly larger than the actual bandwidth requirements of all TSN streams comprising the TSN traffic class that these one or more 5G QoS flows support.

Embodiment 11: The method of any of embodiments 3 to 10, comprising: upon receiving TSN traffic class specific information, mapping the corresponding TSN streams into an already existing 5G QoS flow that efficiently supports the bandwidth requirements of those TSN streams.

Embodiment 12: The method of embodiment 11 comprising ensuring that all TSN streams associated with any given TSN traffic class are efficiently supported using a single 5G QoS flow.

Embodiment 13: The method of any of embodiments 11 to 12 comprising ensuring that the admission of any given TSN traffic class by a 5GS ensures that the TSN streams associated with that TSN traffic class will be successfully supported by the 5GS and allows for realizing that support over the radio interface in a bandwidth efficient manner.

Embodiment 14: The method of any of embodiments 1 to 13 wherein the first node is a 5G node.

Embodiment 15: The method of embodiment 14 wherein the first node is a TSN Application Function, AF.

Embodiment 16: The method of any of embodiments 1 to 15 wherein the traffic class specific information is received from a Centralized Network Controller, CNC, within a TSN network.

Embodiment 17: The method of any of the previous embodiments, further comprising: providing user data; and forwarding the user data to a host computer via the transmission to the base station.

Group B Embodiments

Embodiment 18: A method performed by a second node for mapping Time-Sensitive Networking, TSN, streams, the method comprising one or more of: deciding which TSN streams to include within any given traffic class; and transmitting traffic class specific information for one or more TSN stream.

Embodiment 19: The method of embodiment 18 wherein deciding which TSN streams to include within any given traffic class comprises implicitly establishing a value for the maximum payload volume that needs to be supported per instance of transmission for all TSN streams in that traffic class.

Embodiment 20: The method of any of embodiments 18 to 19 wherein deciding which TSN streams to include within any given traffic class comprises ensuring that the maximum payload volume that needs to be supported per instance of transmission for all TSN streams within each traffic class will be efficiently supported by a 5QI table entry already configured by the 5GS.

Embodiment 21: The method of embodiment 20 wherein deciding which TSN streams to include within any given traffic class comprises ensuring the maximum payload volume per transmission instance for all TSN streams comprising that TSN traffic class is equal to or slightly less than the MDBV attribute of a 5QI table entry for which it has received information from the 5GS.

Embodiment 22: The method of any of embodiments 18 to 21 wherein the second node is a Centralized Network Controller, CNC, within a TSN network.

Embodiment 23: The method of any of embodiments 18 to 22 wherein the traffic class specific information is transmitted to a 5G node.

Embodiment 24: The method of embodiment 23 wherein the 5G node is a TSN Application Function, AF.

Embodiment 25: The method of any of the previous embodiments, further comprising: obtaining user data; and forwarding the user data to a host computer or a wireless device.

Group C Embodiments

Embodiment 26: A first node for mapping Time-Sensitive Networking, TSN, streams, the first node comprising: processing circuitry configured to perform any of the steps of any of the Group A embodiments; and power supply circuitry configured to supply power to the first node.

Embodiment 27: A second node for mapping Time-Sensitive Networking, TSN, streams, the second node comprising: processing circuitry configured to perform any of the steps of any of the Group B embodiments; and power supply circuitry configured to supply power to the second node.

Embodiment 28: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 29: The communication system of the previous embodiment further including the base station.

Embodiment 30: The communication system of the previous 2 embodiments, further including the UE, wherein the UE is configured to communicate with the base station.

Embodiment 31: The communication system of the previous 3 embodiments, wherein: the processing circuitry of the host computer is configured to execute a host application, thereby providing the user data; and the UE comprises processing circuitry configured to execute a client application associated with the host application.

Embodiment 32: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 33: The method of the previous embodiment, further comprising, at the base station, transmitting the user data.

Embodiment 34: The method of the previous 2 embodiments, wherein the user data is provided at the host computer by executing a host application, the method further comprising, at the UE, executing a client application associated with the host application.

Embodiment 35: A User Equipment, UE, configured to communicate with a base station, the UE comprising a radio interface and processing circuitry configured to perform the method of the previous 3 embodiments.

Embodiment 36: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 37: The communication system of the previous embodiment, wherein the cellular network further includes a base station configured to communicate with the UE.

Embodiment 38: The communication system of the previous 2 embodiments, wherein: the processing circuitry of the host computer is configured to execute a host application, thereby providing the user data; and the UE's processing circuitry is configured to execute a client application associated with the host application.

Embodiment 39: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 40: The method of the previous embodiment, further comprising at the UE, receiving the user data from the base station.

Embodiment 41: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 42: The communication system of the previous embodiment, further including the UE.

Embodiment 43: The communication system of the previous 2 embodiments, further including the base station, wherein the base station comprises a radio interface configured to communicate with the UE and a communication interface configured to forward to the host computer the user data carried by a transmission from the UE to the base station.

Embodiment 44: The communication system of the previous 3 embodiments, wherein: the processing circuitry of the host computer is configured to execute a host application; and the UE's processing circuitry is configured to execute a client application associated with the host application, thereby providing the user data.

Embodiment 45: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 46: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 47: The method of the previous embodiment, further comprising, at the UE, providing the user data to the base station.

Embodiment 48: The method of the previous 2 embodiments, further comprising: at the UE, executing a client application, thereby providing the user data to be transmitted; and at the host computer, executing a host application associated with the client application.

Embodiment 49: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 50: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 51: The communication system of the previous embodiment further including the base station.

Embodiment 52: The communication system of the previous 2 embodiments, further including the UE, wherein the UE is configured to communicate with the base station.

Embodiment 53: The communication system of the previous 3 embodiments, wherein: the processing circuitry of the host computer is configured to execute a host application; and the UE is configured to execute a client application associated with the host application, thereby providing the user data to be received by the host computer.

Embodiment 54: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 55: The method of the previous embodiment, further comprising at the base station, receiving the user data from the UE.

Embodiment 56: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
5QI 5G Quality of Service Identifier
AF Application Function
AMBR Aggregated Maximum Bit Rate
AMF Access and Mobility Function
AN Access Network
AP Access Point
ASIC Application Specific Integrated Circuit
AUSF Authentication Server Function
CNC Centralized Network Controller
CPU Central Processing Unit
CUC Centralized User Configuration
DN Data Network
DRB Data Radio Bearer
DSP Digital Signal Processor
eNB Enhanced or Evolved Node B
E-UTRA Evolved Universal Terrestrial Radio Access
FPGA Field Programmable Gate Array
GBR Guaranteed Bit Rate
gNB New Radio Base Station
gNB-DU New Radio Base Station Distributed Unit
HSS Home Subscriber Server
IoT Internet of Things
IP Internet Protocol
LTE Long Term Evolution
MDBV Maximum Data Burst Volume
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
PDB Packet Delay Budget
PDU Protocol Data Unit
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
TC Traffic Class
TS Technical Specification
TSC Time Sensitive Communications
TSN Time-Sensitive Networking
UDM Unified Data Management
UE User Equipment
UPF User Plane Function
UPF-NW-TT User Plane Function Network TSN Translator Those skilled in the art will recognize improvements and modifications to the embodiments of the present disclosure. All such improvements and modifications are considered within the scope of the concepts disclosed herein.

What is claimed is:

1. A method performed by a first node for mapping Time-Sensitive Networking, TSN, streams, to one or more 5G Quality of Service, QoS, flows, the method comprising:
   receiving traffic class specific information for one or more TSN streams; and
   determining a set of the one or more 5G QoS flows to support a traffic class based on the received traffic class specific information;
   the method further comprising:
   establishing a set of 5G QoS Identifier, 5QI, table entries for which different values are determined independent of knowing which TSN streams will map to any given traffic class; and
   upon receiving the TSN traffic class specific information, mapping corresponding TSN streams into subgroups where each subgroup is supported by a common 5G QoS flow having values indicated by its corresponding 5QI table entry;
   wherein each 5G QoS flow used to support each subgroup is selected such that it ensures a PDB requirement and the maximum payload volume per transmission instance of the corresponding subgroup are satisfied.

2. The method of claim 1 wherein receiving the traffic class specific information for the one or more TSN streams comprises receiving traffic class specific Packet Delay Budget, PDB, and maximum payload volume per transmission instance for each TSN stream in that traffic class.

3. The method of claim 1 wherein the different values comprise different values for one or more of the traffic class specific PDB and Maximum Data Burst Volume, MDBV, attributes.

4. The method of claim 1 further comprising:
ensuring that all TSN streams in each subgroup associated with any given TSN traffic class are efficiently supported using multiple 5G QOS flows.

5. The method of claim 1 wherein a radio interface bandwidth allocated in support of each 5G QOS flow can be made equal to or slightly larger than actual bandwidth requirements of a subgroup of TSN streams supported thereon.

6. The method of claim 1, further comprising:
upon receiving the TSN traffic class specific information, configuring one or more new 5QI table entries wherein each has an appropriate PDB attribute and MDBV attribute that, when considered together, provide a value large enough to support the maximum payload volume per transmission instance for all TSN streams comprising that TSN traffic class.

7. The method of claim 6 further comprising:
ensuring that all TSN streams associated with any given TSN traffic class are efficiently supported using the one or more 5G QoS flows.

8. The method of claim 7 wherein the radio interface bandwidth allocated in support of the one or more 5G QoS flows can be made equal to or slightly larger than actual bandwidth requirements of all TSN streams comprising the TSN traffic class that the one or more 5G QoS flows support.

9. The method of claim 1, further comprising:
upon receiving the TSN traffic class specific information, mapping the corresponding TSN streams into an already existing 5G QoS flow that efficiently supports bandwidth requirements of those TSN streams.

10. The method of claim 9 further comprising:
ensuring that all the TSN streams associated with any given TSN traffic class are efficiently supported using a single 5G QoS flow.

11. The method of claim 9 further comprising:
ensuring that admission of any given TSN traffic class by a 5G System, 5GS, ensures that the TSN streams associated with that TSN traffic class will be successfully supported by the 5GS and allows for realizing that support over a radio interface in a bandwidth efficient manner.

12. The method of claim 1 wherein the first node is a 5G node.

13. The method of claim 12 wherein the first node is a TSN Application Function, AF.

14. The method of claim 1 wherein the traffic class specific information is received from a Centralized Network Controller, CNC, within a TSN network.

15. A first node for mapping Time-Sensitive Networking, TSN, streams, the first node comprising:
one or more processors; and
memory comprising instructions to cause the first node to:
receive traffic class specific information for one or more TSN streams; and
determine a set of one or more Fifth Generation, 5G, Quality of Service, QoS, flows to support a traffic class based on the received traffic class specific information;
establishing a set of 5G QoS Identifier, 5QI, table entries for which different values are determined independent of knowing which TSN streams will map to any given traffic class; and
upon receiving the TSN traffic class specific information, mapping corresponding TSN streams into subgroups where each subgroup is supported by a common 5G QoS flow having values indicated by its corresponding 5QI table entry;
wherein each 5G QoS flow used to support each subgroup is selected such that it ensures a PDB requirement and the maximum payload volume per transmission instance of the corresponding subgroup are satisfied.

* * * * *